(12) United States Patent
Sato

(10) Patent No.: US 9,445,091 B2
(45) Date of Patent: Sep. 13, 2016

(54) IMAGE PROCESSING DEVICE AND METHOD FOR MOTION VECTOR ENCODING USING TEMPORAL PREDICTION AND SPATIAL PREDICTION

(75) Inventor: Kazushi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 14/118,286

(22) PCT Filed: Jun. 21, 2012

(86) PCT No.: PCT/JP2012/065817
§ 371 (c)(1),
(2), (4) Date: Nov. 18, 2013

(87) PCT Pub. No.: WO2013/002108
PCT Pub. Date: Jan. 3, 2013

(65) Prior Publication Data
US 2014/0079133 A1    Mar. 20, 2014

(30) Foreign Application Priority Data

Jun. 29, 2011 (JP) ................................. 2011-144298

(51) Int. Cl.
*H04N 19/51* (2014.01)
*H04N 19/52* (2014.01)
(Continued)

(52) U.S. Cl.
CPC ........ *H04N 19/00696* (2013.01); *H04N 19/52* (2014.11); *H04N 7/014* (2013.01); *H04N 19/513* (2014.11); *H04N 19/521* (2014.11); *H04N 19/527* (2014.11)

(58) Field of Classification Search
CPC ........... H04N 19/00696; H04N 19/51; H04N 19/513

USPC .................................................... 375/240.16
See application file for complete search history.

(56) References Cited

U.S. PATENT DOCUMENTS

2012/0257678 A1* 10/2012 Zhou .................... H04N 19/436
375/240.16
2012/0307903 A1* 12/2012 Sugio ................... H04N 19/521
375/240.16

(Continued)

OTHER PUBLICATIONS

Itani et al. ("Joint Coolaborative Team on Video Coding (JCT-VC) of ITU-T SG16 WP3 and ISO/IEC JTC1/SC29/WG11: Improvement to AMVP/Merge process"), 5th Meeting: Geneva, CH, Mar. 16-23, 2011.*

(Continued)

*Primary Examiner* — William C Vaughn, Jr.
*Assistant Examiner* — Joseph A Towe
(74) *Attorney, Agent, or Firm* — Paratus Law Group, PLLC

(57) ABSTRACT

The present technique relates to an image processing device and method for preventing increases in the processing load of image encoding and decoding. The image processing device includes: a temporal prediction control unit that controls, in a prediction of a motion vector, whether a temporal prediction is to be performed to predict the motion vector by using the motion vector of a neighbor region temporally adjacent to the current region being processed; and a motion vector encoding unit that predicts the motion vector of the current region by performing only a spatial prediction to predict the motion vector from the motion vector of a neighbor region spatially adjacent to the current region or performing both the spatial prediction and the temporal prediction under the control of the temporal prediction control unit, and encodes the motion vector of the current region by using the predicted value.

18 Claims, 20 Drawing Sheets

(51) Int. Cl.
*H04N 19/513* (2014.01)
*H04N 19/527* (2014.01)
*H04N 7/01* (2006.01)

(56) References Cited

U.S. PATENT DOCUMENTS

2012/0328021 A1* 12/2012 Sugio .................... H04N 19/56
375/240.16
2014/0078254 A1* 3/2014 Lin ...................... H04N 19/597
348/43

OTHER PUBLICATIONS

Su et al. ("Joint Collaborative Team on Video Coding (JCT-VC) of ITU-T SG16 WP3 and ISO/IEC JTC1/SC29/WG11: On motion vector competition"), 3rd Meeting: Guangzhou, CN, Oct. 7-15, 2010.*

Itani et al. "Joint Collaborative Team on Video Coding (JCT-VC) of ITU-T SG16 WP3 and ISO/IEC JTC1/SC29/WG11: Improvement to AMVP/Merge process", 5th Meeting: Geneva, CH, Mar. 16-23, 2011.*

Joel Jung, et al., Competition-Based Scheme for Motion Vector Selection and Coding, ITU—Telecommunications Standardization Sector Video Coding Experts Group (VCEG), Jul. 17-18, 2006, pp. 1-7, $29^{th}$ Meeting: Klagenfurt, Austria.

Martin Winken, et al., Description of video coding technology proposal by Fraunhofer HHI, Joint Collaborative Team on Video-Coding (JCT-VC) of ITU-T SG16 WP3 and ISO/IEC JTC1/SC29/WG11, Apr. 15-23, 2010, pp. 1-44, $1^{st}$ Meeting: Dresden, DE.

Thomas Wiegand, WD1: Working Draft 1 of High-Efficiency Video Coding, Joint Collaborative Team on Video-Coding (JCT-VC) of ITU-T SG16 WP3 and ISO/IEC JTC1/SC29/WG11, Oct. 7-15, 2010, pp. 1-137, $3^{rd}$ Meeting: Guangzhou, CN.

* cited by examiner

IMAGE PROCESSING DEVICE AND METHOD FOR MOTION VECTOR ENCODING USING TEMPORAL PREDICTION AND SPATIAL PREDICTION

CROSS REFERENCE TO PRIOR APPLICATION

This application is a National Stage Patent Application of PCT International Patent Application No. PCT/JP2012/065817 (filed on Jun. 21, 2012) under 35 U.S.C. §371, which claims priority to Japanese Patent Application No. 2011-144298 (filed on Jun. 29, 2011), which are all hereby incorporated by reference in their entirety.

TECHNICAL FIELD

This disclosure relates to image processing devices and methods, and more particularly, to an image processing device and method that enable easier image encoding and decoding.

BACKGROUND ART

In recent years, to handle image information as digital information and achieve high-efficiency information transmission and accumulation in doing do, apparatuses compliant with a standard, such as MPEG (Moving Picture Experts Group) for compressing image information through orthogonal transforms such as discrete cosine transforms and motion compensation by using redundancy inherent to image information, have spread among broadcast stations that distribute information and among general households that receive information.

Particularly, MPEG2 (ISO (International Organization for Standardization)/IEC (International Electrotechnical Commission) 13818-2) is defined as a general-purpose image encoding standard, and is applicable to interlaced images and non-interlaced images, and to standard-resolution images and high-definition images. Currently, MPEG2 is used in a wide range of applications for professionals and general consumers. By using the MPEG2 compression method, a bit rate of 4 to 8 Mbps is assigned to an interlaced image having a standard resolution of 720×480 pixels, and a bit rate of 18 to 22 Mbps is assigned to an interlaced image having a high-resolution of 1920×1088 pixels, for example. Accordingly, high compression rates and excellent image quality can be realized.

MPEG2 is designed mainly for high-quality image encoding suited for broadcasting, but is not compatible with lower bit rates than that of MPEG1 or encoding methods involving higher compression rates. As mobile terminals are becoming popular, the demand for such encoding methods is expected to increase in the future, and to meet the demand, the MPEG4 encoding method has been standardized. As for image encoding methods, the ISO/IEC 14496-2 standard was approved as an international standard in December 1998.

Further, establishment of a standard called H.26L (ITU-T (International Telecommunication Union Telecommunication Standardization Sector) Q6/16 VCEG (Video Coding Expert Group)), which is originally intended for encoding images for video conferences, is currently under way. Compared with the conventional encoding methods such as MPEG2 and MPEG4, H.26L requires a larger amount of calculation in encoding and decoding, but is known to achieve a higher encoding efficiency. Also, as a part of the MPEG4 activity, "Joint Model of Enhanced-Compression Video Coding" is now being established as a standard for achieving a higher encoding efficiency by incorporating functions unsupported by H.26L into the functions based on H.26L.

On the standardization schedule, the standard was approved as an international standard under the name of H.264 and MPEG-4 Part 10 (Advanced Video Coding, hereinafter referred to as AVC) in March 2003.

However, the macroblock size of 16×16 pixels might not be optimal for a large frame such as an UHD (Ultra High Definition: 4000×2000 pixels) frame to be encoded by a next-generation encoding method.

In view of this, to achieve an even higher encoding efficiency than that achieved by AVC, an encoding method called HEVC (High Efficiency Video Coding) is now being standardized by JCTVC (Joint Collaboration Team-Video Coding), which is a joint standards organization of ITU-T and ISO/IEC (see Non-Patent Document 1, for example).

According to the HEVC encoding method, coding units (CUs) are defined as processing units like macroblocks of AVC. Unlike the macroblocks of AVC, the CUs are not fixed to the size of 16×16 pixels, and the size of the CUs is specified in the compressed image information in each sequence.

Meanwhile, to improve motion vector encoding using median predictions defined in AVC, there has been a suggestion to use not only "Spatial Predictor" but also "Temporal Predictor" and "Spatio-Temporal Predictor" as candidates for predicted motion vectors (see Non-Patent Document 2, for example).

Also, as one of motion information encoding methods, there is a suggested method called "Motion Partition Merging", by which "Merge_Flag" and "Merge_Left_Flag" are transmitted (see Non-Patent Document 3, for example).

CITATION LIST

Non-Patent Documents

Non-Patent Document 1: Thomas Wiegand, Woo-Jin Han, Benjamin Bross, Jens-Rainer Ohm, Gary J. Sullivan, "Working Draft 1 of High-Efficiency Video Coding", JCTVC-C403, Joint Collaborative Team on Video Coding (JCT-VC) of ITU-T SG16 WP3 and ISO/IEC JTC1/SC29/WG113rd Meeting: Guangzhou, CN, 7-15 Oct. 2010

Non-Patent Document 2: Joel Jung, Guillaume Laroche, "Competition-Based Scheme for Motion Vector Selection and Coding", VCEG-AC06, ITU—Telecommunications Standardization Sector STUDY GROUP 16 Question 6Video Coding Experts Group (VCEG) 29th Meeting: Klagenfurt, Austria, 17-18 Jul. 2006

Non-Patent Document 3: Martin Winken, Sebastian Bosse, Benjamin Bross, Philipp Helle, Tobias Hinz, Heiner Kirchhoffer, Haricharan Lakshman, Detlev Marpe, Simon Oudin, Matthias Preiss, Heiko Schwarz, Mischa Siekmann, Karsten Suehring, and Thomas Wiegand, "Description of video coding technology proposed by Fraunhofer HHI", JCTVC-A116, April, 2010

SUMMARY OF THE INVENTION

Problems to be Solved by the Invention

However, in a case where temporal predictors have particularly large frames, and often generate small PUs, there is a possibility that access to the memory becomes more frequent and a greater memory bandwidth is required.

This disclosure is made in view of those circumstances, and is to prevent increases in the processing load related to image encoding and decoding.

Solutions to Problems

One aspect of this disclosure is an image processing device that includes: a temporal prediction control unit that controls, in a prediction of a motion vector, whether a temporal prediction is to be performed to predict the motion vector by using the motion vector of a neighbor region temporally adjacent to the current region being processed; and a motion vector encoding unit that predicts the motion vector of the current region by performing only a spatial prediction to predict the motion vector from the motion vector of a neighbor region spatially adjacent to the current region or performing both the spatial prediction and the temporal prediction under the control of the temporal prediction control unit, and encodes the motion vector of the current region by using the predicted value.

The temporal prediction control unit may control whether the temporal prediction is to be performed, in accordance with the size of the current region.

When the size of the current region is equal to or smaller than a predetermined threshold value, the temporal prediction control unit may perform control so that the temporal prediction is not to be performed.

The image processing device may further include a threshold setting unit that sets the threshold value. When the size of the current region is equal to or smaller than the threshold value set by the threshold setting unit, the temporal prediction control unit may perform control so that the temporal prediction is not to be performed.

The threshold setting unit sets the threshold value in accordance with a profile level.

The image processing device may further include a transmission unit that transmits the threshold value.

The temporal prediction control unit may control whether the temporal prediction is to be performed, in accordance with the number of times a temporally-predicted motion vector that is the motion vector of the current region predicted through the temporal prediction has been adopted as a predicted value of the motion vector of the current value.

When the number of times per predetermined data unit has reached a predetermined threshold value, the temporal prediction control unit may perform control so that the temporal prediction is not to be performed.

The image processing device may further include a threshold setting unit that sets the threshold value. When the number of times per predetermined data unit has reached the threshold value set by the threshold setting unit, the temporal prediction control unit may perform control so that the temporal prediction is not to be performed.

The threshold setting unit may set the threshold value in accordance with a profile level.

The threshold setting unit may set the threshold value in accordance with the size of the predetermined data unit.

The predetermined data unit may be an LCU (Largest Coding Unit).

The threshold value may be set for each prediction direction, and, when the number of times per predetermined data unit has reached the threshold value for at least one of the prediction directions, the temporal prediction control unit may perform control so that the temporal prediction is not to be performed.

The image processing device may further include a transmission unit that transmits the threshold value.

The image processing device may further include: a determination unit that determines whether all the motion vectors of neighbor regions spatially adjacent to the current region are unavailable; and a setting unit that sets a zero vector as a predicted value of the motion vector of the current region when the determination unit determines that all the motion vectors of the neighbor regions spatially adjacent to the current region are unavailable, regardless of whether the temporal prediction control unit performs control so that the temporal prediction is to be performed.

When the motion vector of the current region is predicted only through the spatial prediction, the motion vector encoding unit may assign a code number to the predicted value by using a code number assignment table showing types of predicted values excluding the temporal prediction.

The image processing device may further include a transmission unit that transmits the code number assignment table.

The motion vector encoding unit may include: a temporal prediction unit that performs the temporal prediction and generates a temporally-predicted motion vector as the motion vector of the current region predicted through the temporal prediction, when the temporal prediction is allowed by the temporal prediction control unit; a spatial prediction unit that performs the spatial prediction, and generates a spatially-predicted motion vector as the motion vector of the current region predicted through the spatial prediction; a predicted motion vector generation unit that sets a predicted value of the motion vector of the current region that is the temporally-predicted motion vector generated by the temporal prediction unit or the spatially-predicted motion vector generated by the spatial prediction unit, whichever is more similar to the motion vector of the current region; and a difference value calculation unit that calculates a difference value between the motion vector of the current region and the predicted value generated by the predicted motion vector generation unit.

The image processing device may further include a transmission unit that transmits the difference value calculated by the difference value calculation unit.

The one aspect of this disclosure is also an image processing method for an image processing device. By this method, the temporal prediction control unit controls, in a prediction of a motion vector, whether a temporal prediction is to be performed to predict the motion vector by using the motion vector of a neighbor region temporally adjacent to the current region being processed. Under the control of the temporal prediction control unit, the motion vector encoding unit predicts the motion vector of the current region by performing only a spatial prediction to predict the motion vector from the motion vector of a neighbor region spatially adjacent to the current region or performing both the spatial prediction and the temporal prediction, and encodes the motion vector of the current region by using the predicted value.

According to the one aspect of this disclosure, in a prediction of a motion vector, whether a temporal prediction is to be performed to predict the motion vector by using the motion vector of a neighbor region temporally adjacent to the current region being processed is controlled. Under such control, the motion vector of the current region is predicted by performing only a spatial prediction to predict the motion vector from the motion vector of a neighbor region spatially adjacent to the current region or performing both the spatial prediction and the temporal prediction. The motion vector of the current region is encoded by using the predicted value.

Effects of the Invention

According to this disclosure, images can be processed. Particularly, increases in the processing load related to image encoding and decoding can be prevented.

MODES FOR CARRYING OUT THE INVENTION

The following is a description of modes (hereinafter referred to as embodiments) for carrying out this disclosure. Explanation will be made in the following order.

1. First Embodiment (Limitations on temporal predictions in accordance with region size)
2. Second Embodiment (Limitations on temporal predictions in accordance with the number of temporally-predicted motion vectors)
3. Third Embodiment (Control depending on availability of spatial neighbor motion vectors)
4. Fourth Embodiment (Predicted motion vector check)
5. Fifth Embodiment (Computer)
6. Sixth Embodiment (Television receiver)
7. Seventh Embodiment (Portable telephone device)
8. Eighth Embodiment (Recording/reproducing apparatus)
9. Ninth Embodiment (Imaging apparatus)

1. First Embodiment

Image Encoding Device

Figure 1:
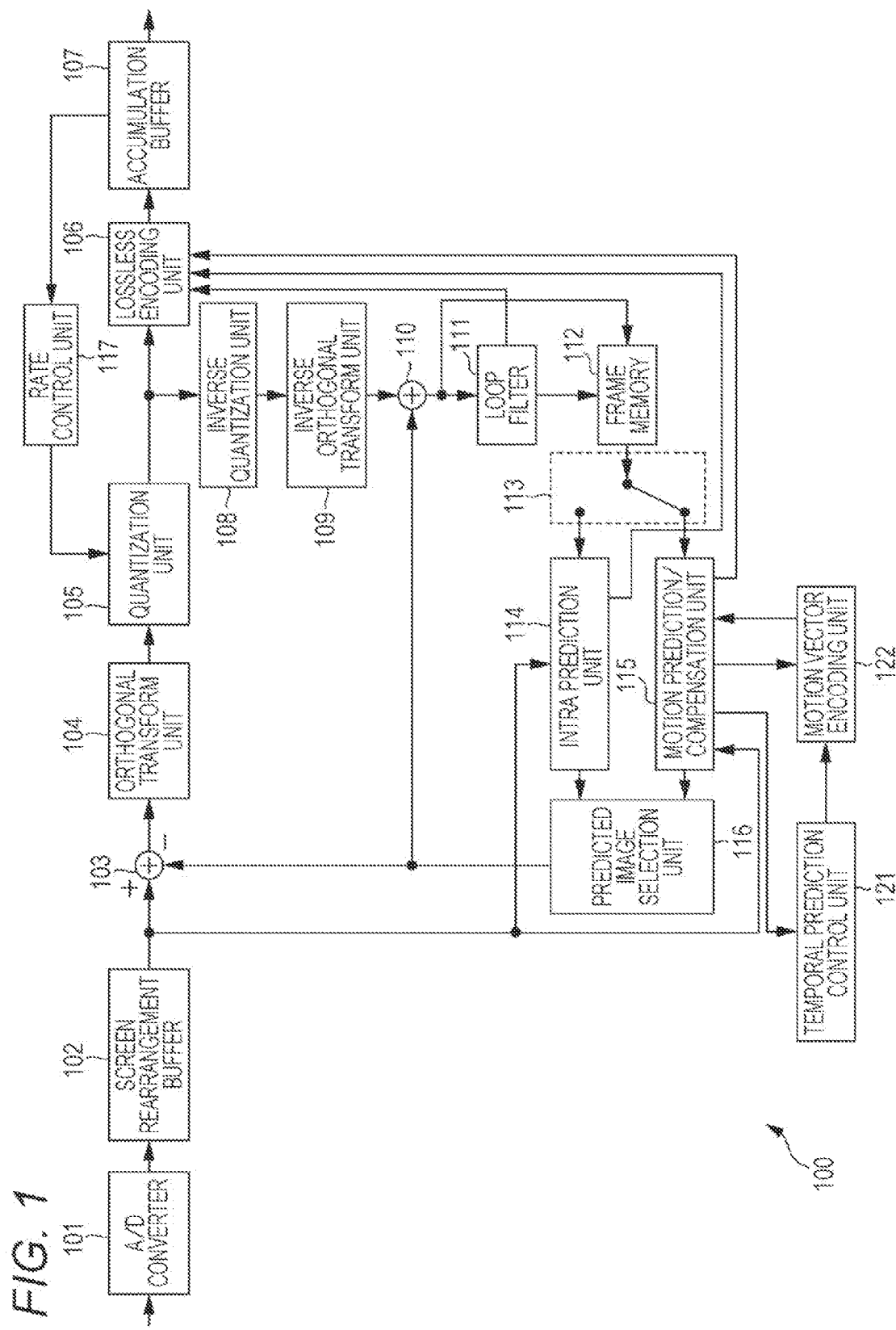
FIG. 1 is a block diagram showing a typical example structure of an image encoding device.

FIG. 1 is a block diagram showing a typical example structure of an image encoding device that is an image processing device.

The image encoding device 100 shown in FIG. 1 encodes image data by using a prediction process according to an encoding method such as the H.264 and MPEG (Moving Picture Experts Group) 4 Part 10 (AVC (Advanced Video Coding)) encoding methods.

As shown in FIG. 1, the image encoding device 100 includes an A/D converter 101, a screen rearrangement buffer 102, an arithmetic operation unit 103, an orthogonal transform unit 104, a quantization unit 105, a lossless encoding unit 106, and an accumulation buffer 107. The image encoding device 100 also includes an inverse quantization unit 108, an inverse orthogonal transform unit 109, an arithmetic operation unit 110, a loop filter 111, a frame memory 112, a selection unit 113, an intra prediction unit 114, a motion prediction/compensation unit 115, a predicted image selection unit 116, and a rate control unit 117.

The image encoding device 100 further includes a temporal prediction control unit 121 and a motion vector encoding unit 122.

The A/D converter 101 subjects input image data to an A/D conversion, and supplies the converted image data (digital data) to the screen rearrangement buffer 102, which then stores the converted image data. The screen rearrangement buffer 102 rearranges the image frames stored in displaying order in accordance with the GOP (Group of Pictures), so that the frames are arranged in encoding order. The screen rearrangement buffer 102 supplies the image having the rearranged frame order to the arithmetic operation unit 103. The screen rearrangement buffer 102 also supplies the image having the rearranged frame order to the intra prediction unit 114 and the motion prediction/compensation unit 115.

The arithmetic operation unit 103 subtracts a predicted image supplied from the intra prediction unit 114 or the motion prediction/compensation unit 115 via the predicted image selection unit 116, from the image read from the screen rearrangement buffer 102, and outputs the difference information to the orthogonal transform unit 104.

When intra encoding is to be performed on the image, for example, the arithmetic operation unit 103 subtracts a predicted image supplied from the intra prediction unit 114, from the image read from the screen rearrangement buffer 102. When inter encoding is to be performed on the image, for example, the arithmetic operation unit 103 subtracts a predicted image supplied from the motion prediction/compensation unit 115, from the image read from the screen rearrangement buffer 102.

The orthogonal transform unit 104 performs an orthogonal transform process, such as a discrete cosine transform or a Karhunen-Loeve transform, on the difference information supplied from the arithmetic operation unit 103. This orthogonal transform is performed by any method. The orthogonal transform unit 104 supplies the transform coefficient to the quantization unit 105.

The quantization unit 105 quantizes the transform coefficient supplied from the orthogonal transform unit 104. Based on information about a target bit rate value supplied from the rate control unit 117, the quantization unit 105 sets a quantization parameter, and performs quantization. This quantization is performed by any method. The quantization unit 105 supplies the quantized transform coefficient to the lossless encoding unit 106.

The lossless encoding unit 106 encodes the transform coefficient quantized by the quantization unit 105 by an encoding method. Since the coefficient data has been quantized under the control of the rate control unit 117, the bit rate becomes equal to the target value (or approximates the target value) that has been set by the rate control unit 117.

The lossless encoding unit 106 obtains intra prediction information including information indicating an intra prediction mode and the like from the intra prediction unit 114, and obtains inter prediction information including information indicating an inter prediction mode, motion vector information, and the like from the motion prediction/compensation unit 115. The lossless encoding unit 106 further obtains the filter coefficient and the like used at the loop filter 111.

The lossless encoding unit 106 encodes the various kinds of information by an encoding method, and incorporates (multiplexes) the various kinds of information into the header information of encoded data. The lossless encoding unit 106 supplies the encoded data obtained through the encoding to the accumulation buffer 107, which then stores the encoded data.

The encoding method used by the lossless encoding unit 106 may be variable-length encoding or arithmetic encoding, for example. The variable-length encoding may be CAVLC (Context-Adaptive Variable Length Coding) specified in H.264/AVC, for example. The arithmetic encoding may be CABAC (Context-Adaptive Binary Arithmetic Coding), for example.

The accumulation buffer 107 temporarily stores the encoded data supplied from the lossless encoding unit 106. The accumulation buffer 107 outputs the stored encoded data as a bit stream to a recording device (a recording medium) (not shown) or a transmission path (not shown) in a later stage at a predetermined time, for example. That is, the various kinds of encoded information are supplied to the decoding side.

The transform coefficient quantized by the quantization unit 105 is also supplied to the inverse quantization unit 108. The inverse quantization unit 108 inversely quantizes the quantized transform coefficient by a method compatible with the quantization performed by the quantization unit 105. This inverse quantization may be performed by any method, as long as the method is compatible with the quantization process performed by the quantization unit 105. The inverse quantization unit 108 supplies the obtained transform coefficient to the inverse orthogonal transform unit 109.

The inverse orthogonal transform unit 109 performs an inverse orthogonal transform on the transform coefficient supplied from the inverse quantization unit 108 by a method compatible with the orthogonal transform process performed by the orthogonal transform unit 104. This inverse orthogonal transform may be performed by any method, as long as the method is compatible with the orthogonal transform process performed by the orthogonal transform unit 104. The output subjected to the inverse orthogonal transform (locally restored difference information) is supplied to the arithmetic operation unit 110.

The arithmetic operation unit 110 obtains a locally reconstructed image (hereinafter referred to as the reconstructed image) by adding the predicted image supplied from the intra prediction unit 114 or the motion prediction/compensation unit 115 via the predicted image selection unit 116 to the inverse orthogonal transform result supplied from the inverse orthogonal transform unit 109 or to the locally restored difference information. The reconstructed image is supplied to the loop filter 111 or the frame memory 112.

The loop filter 111 includes a deblocking filter, an adaptive filter, and the like, and performs a filtering process on the decoded image supplied from the arithmetic operation unit 110. For example, the loop filter 111 removes block distortions from the decoded image by performing a deblocking filtering process on the decoded image. Also, the loop filter 111 improves image quality by performing a loop filtering process using a Wiener filter on the deblocking filtering result (the decoded image having block distortions removed therefrom).

The loop filter 111 may perform any filtering process on the decoded image. Also, the loop filter 111 may supply information such as the filter coefficient used in the filtering process to the lossless encoding unit 106, which then encodes the information.

The loop filter 111 supplies the filtering result (hereinafter referred to as the decoded image) to the frame memory 112.

The frame memory 112 stores the reconstructed image supplied from the arithmetic operation unit 110 and the decoded image supplied from the loop filter 111. The frame memory 112 supplies the stored reconstructed image to the intra prediction unit 114 via the selection unit 113 at a predetermined time or in response to a request from an external unit such as the intra prediction unit 114. The frame memory 112 also supplies the stored decoded image to the motion prediction/compensation unit 115 via the selection unit 113 at a predetermined time or in response to a request from an external unit such as the motion prediction/compensation unit 115.

The selection unit 113 indicates the destination to which the image output from the frame memory 112 is supplied. For example, in the case of an intra prediction, for example, the selection unit 113 reads an unfiltered image (the reconstructed image) from the frame memory 112, and supplies the unfiltered image as a neighbor pixel to the intra prediction unit 114.

In the case of an inter prediction, for example, the selection unit 113 reads a filtered image (the decoded image) from the frame memory 112, and supplies the filtered image as a reference image to the motion prediction/compensation unit 115.

The intra prediction unit 114 obtains images (neighbor images) of neighbor regions adjacent to the current region from the frame memory 112, and performs intra predictions (intra-screen predictions) to generate predicted images by using the pixel values of the neighbor images basically on a prediction unit (PU) basis. The intra prediction unit 114 performs the intra predictions in more than one mode (intra prediction mode) that is prepared in advance.

The intra prediction unit 114 generates predicted images in all the candidate intra prediction modes, evaluates the cost function values of the respective predicted images by using the input image supplied from the screen rearrangement buffer 102, and selects an optimum mode. After selecting the optimum intra prediction mode, the intra prediction unit 114 supplies the predicted image generated in the optimum mode to the predicted image selection unit 116.

The intra prediction unit 114 also supplies the intra prediction information including the information about an intra prediction such as the optimum intra prediction mode to the lossless encoding unit 106 where appropriate, so that the lossless encoding unit 106 encodes the information.

Using the input image supplied from the screen rearrangement buffer 102 and the reference image supplied from the frame memory 112, the motion prediction/compensation unit 115 performs motion predictions (inter predictions) basically on PUs as processing units, and performs a motion compensation process in accordance with detected motion vectors, to generate a predicted image (inter predicted image information). The motion prediction/compensation unit 115 performs such inter predictions (inter-screen predictions) in more than one mode (inter prediction modes) that is prepared in advance.

The motion prediction/compensation unit 115 generates predicted images in all the candidate inter prediction modes, evaluates the cost function values of the respective predicted images, and selects an optimum mode. After selecting the optimum inter prediction mode, the motion prediction/compensation unit 115 supplies the predicted image generated in the optimum mode to the predicted image selection unit 116.

The motion prediction/compensation unit 115 also supplies the inter prediction mode information including information about an inter prediction such as the optimum inter prediction mode to the lossless encoding unit 106, which then encodes the information.

The predicted image selection unit 116 selects the supplier of the predicted image to be supplied to the arithmetic operation unit 103 and the arithmetic operation unit 110. In the case of intra encoding, for example, the predicted image selection unit 116 selects the intra prediction unit 114 as the supplier of the predicted image, and supplies the predicted image supplied from the intra prediction unit 114 to the arithmetic operation unit 103 and the arithmetic operation unit 110. In the case of inter encoding, for example, the predicted image selection unit 116 selects the motion prediction/compensation unit 115 as the supplier of the predicted image, and supplies the predicted image supplied from the motion prediction/compensation unit 115 to the arithmetic operation unit 103 and the arithmetic operation unit 110.

Based on the bit rate of the encoded data accumulated in the accumulation buffer 107, the rate control unit 117 controls the quantization process rate of the quantization unit 105 so as not to cause an overflow or underfloor.

The temporal prediction control unit 121 performs a control process to control temporal predictions to generate a predicted motion vector that is a predicted value of the motion vector of the current region being processed, using the motion vectors of temporal neighbor regions. More specifically, the temporal prediction control unit 121 determines whether temporal predictions are to be performed in generating the predicted motion vector.

The motion vector encoding unit 122 generates a predicted motion vector of the current region, and generates a difference motion vector between the predicted motion vector and the motion vector of the current region obtained through a motion search conducted by the motion prediction/compensation unit 115. In doing so, the motion vector encoding unit 122 performs temporal predictions under the control of the temporal prediction control unit 121 at the time of generation of the predicted motion vector.

Coding Units

The macroblock size of 16×16 pixels is not optimal for large frames such as UHD (Ultra High Definition: 4000× 2000 pixels) frames to be encoded by a next-generation encoding method.

Figure 2:
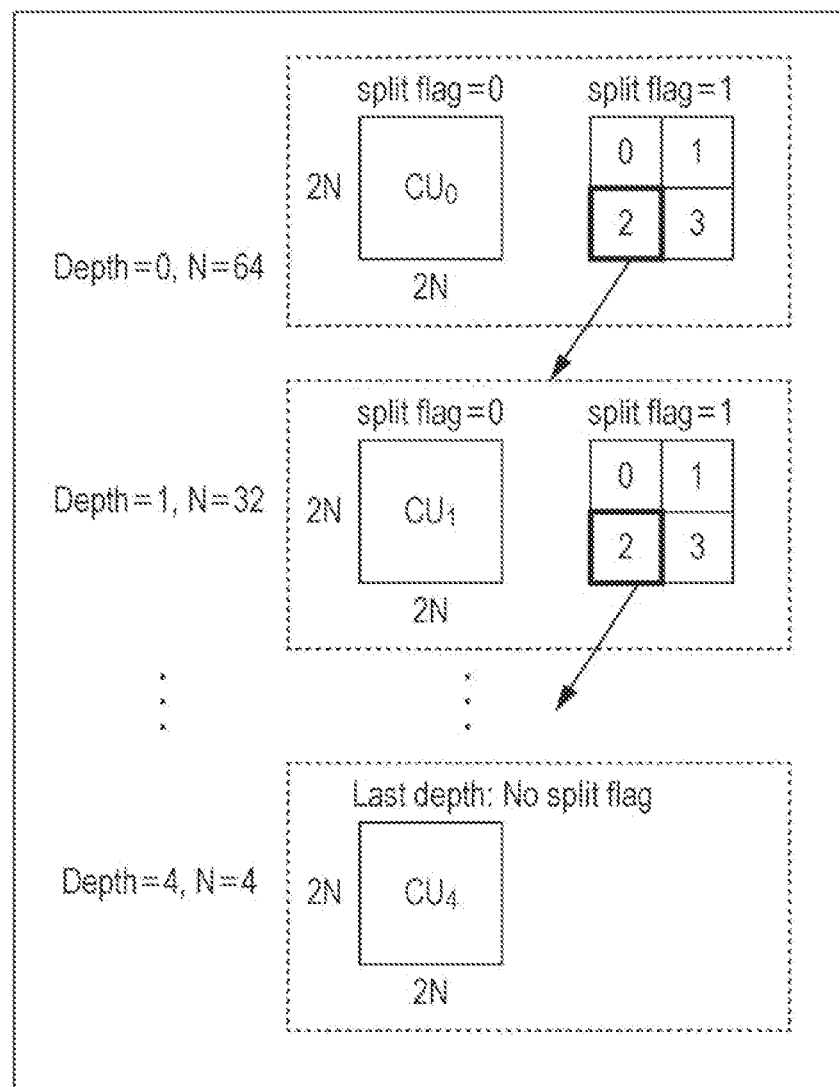
FIG. 2 is a diagram for explaining example structures of coding units.

AVC specifies a hierarchical structure formed with macroblocks and sub macroblocks. In HEVC (High Efficiency Video Coding), however, coding units (CUs) are specified as shown in FIG. 2.

CUs are also called Coding Tree Blocks (CTBs), and are partial regions of picture-based images that have the same roles as those of macroblocks in AVC. While the size of the latter is fixed to the size of 16×16 pixels, the size of the former is not fixed to a certain size, and may be designated by the compressed image information in each sequence.

For example, in a sequence parameter set (SPS) contained in encoded data to be output, the largest coding unit (LCU) and the smallest coding unit (SCU) of the CUs are specified.

In each LCU, split-flag=1 is set within a range not lower than the SCU size, so that each LCU can be divided into CUs of a smaller size. In the example shown in FIG. 2, the size of the LCU is 128, and the greatest hierarchical depth is 5. When the value of split_flag is "1", a CU of 2N×2N in size is divided into CUs of N×N in size, which is one hierarchical level lower.

Each of the CUs is further divided into prediction units (PUs) that are processing-unit regions (partial regions of picture-based images) for intra or inter predictions, or are divided into transform units (TUs) that are processing-unit regions (partial regions of picture-based images) for orthogonal transforms. At present, 16×16 and 32×32 orthogonal transforms, as well as 4×4 and 8×8 orthogonal transforms, can be used in HEVC.

In the case of an encoding method by which CUs are defined, and each kind of processing is performed on a CU basis as in the above described HEVC, the macroblocks in AVC can be considered equivalent to the LCUs. However, a CU has a hierarchical structure as shown in FIG. 2. Therefore, the size of the LCU on the highest hierarchical level is normally as large as 128×128 pixels, which is larger than the size of each macroblock in AVC, for example.

In the following, "regions" include all of (or may be any of) the above described types of regions (macroblocks, sub macroblocks, LCUs, CUs, SCUs, PUs, and TUs, for example). The "regions" may of course include units other than the above described regions, and exclude improbable units depending on the context of the description.

Merging of Motion Partitions

Figure 3:
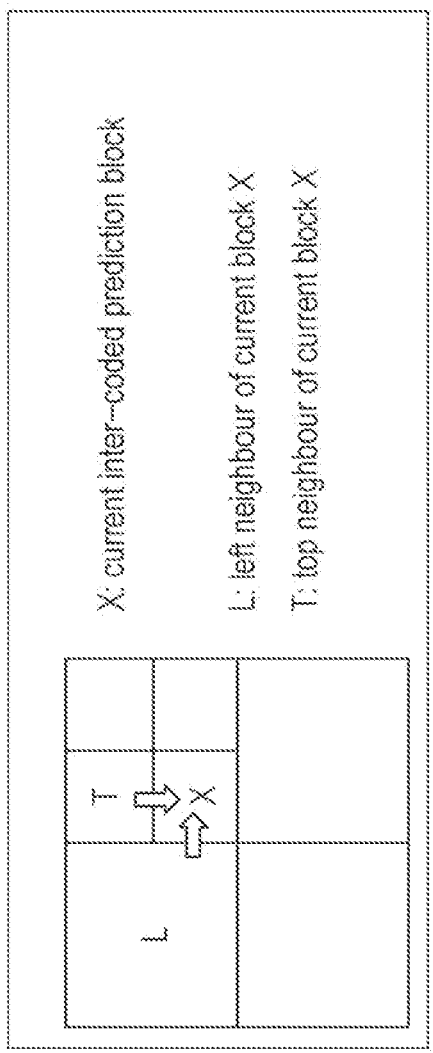
FIG. 3 is a diagram for explaining an example of Motion Partition Merging.

Non-Patent Document 3 discloses a method called Motion Partition Merging (the merge mode) illustrated in FIG. 3 as one of motion information encoding methods. By this method, the two flags, MergeFlag and MergeLeftFlag, are transmitted as merge information that is the information about the merge mode. When MergeFlag is 1, the motion information about the current region X is the same as the motion information about a neighbor region T adjacent to the upper side of the current region or the motion information about a neighbor region L adjacent to the left side of the current region. At this point, the merge information containing MergeLeftFlag is transmitted. When MergeFlag is 0, the motion information about the current region X differs from the motion information about either of the neighbor regions T and L. In this case, the motion information about the current region X is transmitted.

In a case where the motion information about the current region X is the same as the motion information about the neighbor region L, MergeFlag is 1, and MergeLeftFlag is 1. In a case where the motion information about the current region X is the same as the motion information about the neighbor region T, MergeFlag is 1, and MergeLeftFlag is 0.

Temporally-Predicted Motion Vectors

In an intra prediction, motion vector encoding is performed by using a median prediction, so as to reduce the motion vector bit rate. In AVC, for example, a predicted value of a motion vector of the current region (a predicted motion vector) is calculated by using the motion vector (a spatial neighbor motion vector) of a spatial neighbor region that is the region existing in a predetermined position adjacent to the current region in the same frame as the frame of the current region being processed.

Hereinafter, a prediction of a motion vector using the motion vector of a spatial neighbor region will be referred to as a spatial prediction, and a predicted motion vector generated through a spatial prediction will be referred to as a spatially-predicted motion vector.

However, there might be cases where sufficiently high prediction accuracy is not achieved only through spatial predictions, and spatial predictions do not contribute to an increase in encoding efficiency. In view of this, a method using not only spatial predictions but also temporal predictions has been suggested.

In a temporal prediction, a predicted motion vector (also referred to as a temporally-predicted motion vector) is calculated by using the motion vector (a temporal neighbor motion vector) of a co-located region located in the same position as the current region and a temporal neighbor region including a region adjacent to the co-located region in a region that is temporally adjacent to the current region or a reference frame to which the current region is referred.

For example, Non-Patent Document 2 discloses a method of generating not only a spatially-predicted motion vector (Spatial Predictor) through a spatial prediction but also a temporally-predicted motion vector (Temporal Predictor) and a spatially- and temporally-predicted motion vector (Spatio-Temporal Predictor), and adaptively using one of those predicted motion vectors as predicted motion information.

However, to perform temporal predictions, there is a need to store an enormous number of motion vectors. The motion vector of the current region will be used as a spatial neighbor motion vector or a temporal neighbor motion vector in the processing of another region to be processed later. Since the motion information about the past frames is used in a temporal prediction, motion vectors need to be stored in a large-capacity and low-speed storage area such as a DRAM. Therefore, every time a temporal prediction is performed, motion vectors that might be used as temporal neighbor regions are read from the DRAM in accordance with the address of the co-located region.

On the other hand, a spatial neighbor region is located in a position adjacent to the current region in the same frame as the frame (the current frame) of the current region. Accordingly, where horizontal rows in each region are set as lines, the motion information about the one line immediately above the current region and the motion information about one line including the current region (the information containing motion vectors, a reference index, and the like) should be stored so as to perform a spatial prediction. Such information can be properly stored in a small-capacity and high-speed memory such as a line buffer.

As described above, the load related to memory access in a temporal prediction is overwhelmingly larger than the load in the case of memory access for a spatial prediction.

Particularly, in HEVC, encoding can be performed with CUs of 64×64 through 8×8, as described above. In an inter slice, each CU is further divided into PUs of 2N×2N, 2N×N, N×2N, or N×N, and an encoding process is then performed. Therefore, in a case where a temporal prediction is often selected in a small region such as 4×4 in the PU size, for example, the load related to memory access in the temporal predictions becomes even larger, and there are cases where the memory bandwidth becomes a bottleneck and real-time actions become difficult.

In view of the above, the image encoding device 100 puts a limitation on encoding through a temporal prediction in accordance with the size of the current region.

Figure 4:
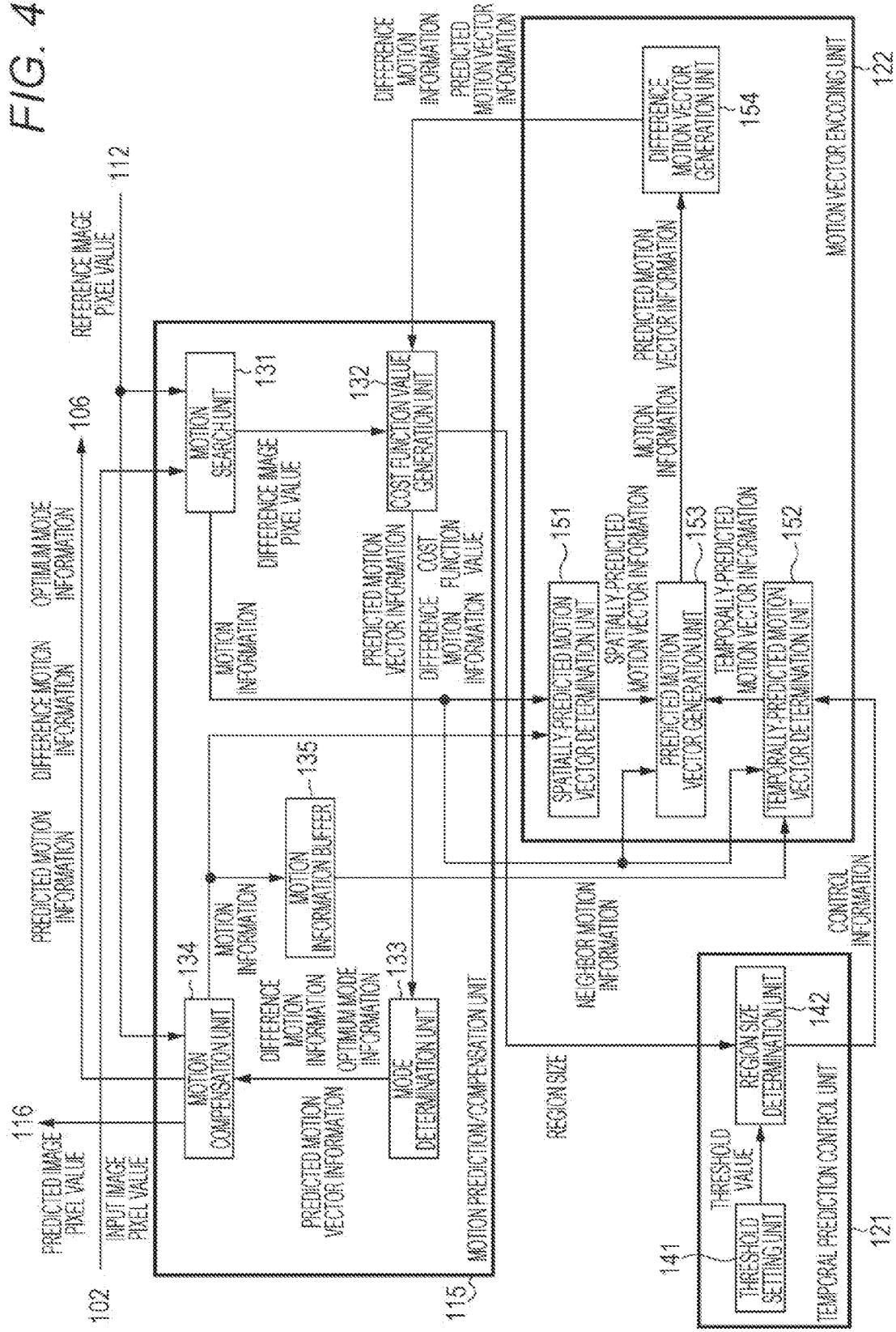
FIG. 4 is a block diagram showing typical example structures of the motion prediction/compensation unit, the temporal prediction control unit, and the motion vector encoding unit.

The Motion Prediction/Compensation Unit, the Temporal Prediction Control Unit, and the Motion Vector Encoding Unit FIG. 4 is a block diagram showing typical example structures of the motion prediction/compensation unit 115, the temporal prediction control unit 121, and the motion vector encoding unit 122 shown in FIG. 1.

As shown in FIG. 4, the motion prediction/compensation unit 115 includes a motion search unit 131, a cost function value generation unit 132, a mode determination unit 133, a motion compensation unit 134, and a motion information buffer 135.

The temporal prediction control unit 121 includes a threshold setting unit 141 and a region size determination unit 142.

Further, the motion vector encoding unit 122 includes a spatially-predicted motion vector determination unit 151, a temporally-predicted motion vector determination unit 152, a predicted motion vector generation unit 153, and a difference motion vector generation unit 154.

An input image pixel value from the screen rearrangement buffer 102 and a reference image pixel value from the frame memory 112 are input to the motion search unit 131. The motion search unit 131 performs a motion search process in all the inter prediction modes, and generates motion information containing motion vectors and a reference index. The motion search unit 131 supplies the motion information to the spatially-predicted motion vector determination unit 151, the temporally-predicted motion vector determination unit 152, and the predicted motion vector generation unit 153 of the motion vector encoding unit 122.

The motion search unit 131 also performs a compensation process on the reference image by using the detected motion vectors, and generates a predicted image. The motion search unit 131 further calculates a difference image between the predicted image and the input image, and supplies a difference image pixel value that is the pixel value of the difference image to the cost function value generation unit 132.

The cost function value generation unit 132 acquires the difference image pixel value of each inter prediction mode supplied from the motion search unit 131. Using the difference image pixel values, the cost function value generation unit 132 calculates cost function value of each inter prediction mode. The cost function value generation unit 132 also acquires the difference motion information about each inter prediction mode and the predicted motion vector information about each inter prediction mode from the difference motion vector generation unit 154 of the motion vector encoding unit 122.

The predicted motion vector information contains a predicted motion vector that is a predicted value of a motion vector of the current region being processed, and information indicating the neighbor region having a motion vector used as a reference in generating the predicted motion vector. The difference motion information contains the difference motion vector indicating the difference between the motion vector of the current region and the predicted motion vector.

The cost function value generation unit 132 supplies the cost function value of each inter prediction mode, the difference motion information, and the predicted motion vector information to the mode determination unit 133.

The mode determination unit 133 acquires the cost function value of each inter prediction mode, the difference motion information, and the predicted motion vector information, which are supplied from the cost function value generation unit 132. The mode determination unit 133 selects an optimum mode that is the inter prediction mode with the smallest cost function value among the cost function values. The mode determination unit 133 supplies optimum mode information that is the information indicating the inter prediction mode selected as the optimum mode, together with the difference motion information and the predicted motion vector information about the optimum inter prediction mode, to the motion compensation unit 134.

Using the difference motion information and the predicted motion vector information supplied from the mode determination unit 133, the motion compensation unit 134 generates a motion vector of the optimum inter prediction mode. The motion compensation unit 134 performs a compensation process on the reference image from the frame memory 112 by using the motion vector, and generates a predicted image in the optimum inter prediction mode. The motion compensation unit 134 supplies the pixel value of the generated predicted image (a predicted image pixel value) to the predicted image selection unit 116.

In a case where an inter prediction is selected by the predicted image selection unit 116, a signal indicating the selection is supplied from the predicted image selection unit 116. In response to that, the motion compensation unit 134 supplies the optimum mode information, together with the difference motion information and the predicted motion information about the optimum inter prediction mode, to the lossless encoding unit 106, which then encodes the information and transmits the encoded information to the decoding side. The predicted motion information contains information indicating the neighbor region having a motion vector used as a reference in generating the predicted motion vector.

The motion compensation unit 134 also supplies the motion information about the optimum inter prediction mode used in generating the predicted image, to the motion information buffer 135 and the spatially-predicted motion vector determination unit 151. In a case where an inter prediction is not selected by the predicted image selection unit 116 (or where an intra-predicted image is selected), a zero vector is supplied as motion vector information to the motion information buffer 135 and the spatially-predicted motion vector determination unit 151.

The motion information buffer 135 includes a large-capacity and low-speed storage area such as a DRAM, and stores the motion information supplied from the motion compensation unit 134 into the storage area. The motion information stored in the motion information buffer 135 will be used as temporal neighbor motion information in temporal predictions. That is, the motion information buffer 135 supplies the stored motion information to the temporally-predicted motion vector determination unit 152 at a predetermined time or in response to a request from outside.

Of the motion information stored in the motion information buffer 135, motion information with no possibility of being used as temporal neighbor motion information is discarded from the storage area of the motion information buffer 135 at a predetermined time such as when the storage area becomes short of free space.

Meanwhile, the cost function value generation unit 132 supplies the region size of the current region in each intra prediction mode to the region size determination unit 142.

The threshold setting unit 141 determines a threshold value that is related to the region size and is to be used by the region size determination unit 142, in accordance with a profile level such as an image size. The threshold setting unit 141 supplies the set threshold value to the region size determination unit 142.

The region size determination unit 142 determines the size of the current region, and controls whether a temporal prediction is to be performed, in accordance with the determined size. More specifically, the region size determination unit 142 performs a determination (a threshold determination) on the size of the current region by using the threshold value set by the threshold setting unit 141. That is, the region size determination unit 142 determines whether the region size of the current region supplied from the cost function value generation unit 132 is larger than the threshold value set by the threshold setting unit 141.

In accordance with the determination result, the region size determination unit 142 controls whether a temporal prediction is to be performed. In a case where the size of the current region is larger than the threshold value, for example, the region size determination unit 142 performs control so that a temporal prediction is to be performed in predicting (encoding) a motion vector. In a case where the size of the current region is larger than the threshold value, for example, the region size determination unit 142 performs control so that a temporal prediction is not to be performed in predicting (encoding) a motion vector. The region size determination unit 142 controls the operation (to determine whether a temporal prediction is to be performed) of the temporally-predicted motion vector determination unit 152 by supplying control information indicating whether a temporal prediction is to be performed to the temporally-predicted motion vector determination unit 152.

The spatially-predicted motion vector determination unit 151 of the motion vector encoding unit 122 acquires and stores motion information supplied from the motion compensation unit 134. The spatially-predicted motion vector determination unit 151 includes a small-capacity and high-speed storage area such as a line buffer, and stores the motion information acquired from the motion compensation unit 134 into the storage area. The motion information will be used as spatial neighbor motion information in spatial predictions.

Of the motion information stored in the spatially-predicted motion vector determination unit 151, motion information with no possibility of being used as spatial neighbor motion information is discarded from the storage area of the spatially-predicted motion vector determination unit 151 at a predetermined time such as when the storage area becomes short of free space. The motion information discarded from the spatially-predicted motion vector determination unit 151 may be supplied to the motion information buffer 135 to store. In that case, the motion information buffer 135 acquires motion information not from the motion compensation unit 134 but from the spatially-predicted motion vector determination unit 151.

The spatially-predicted motion vector determination unit 151 uses stored motion vectors as spatial neighbor motion vectors, and further generates a spatially-predicted motion vector by performing a spatial prediction using the motion information (the motion vector) about each inter prediction mode supplied from the motion search unit 131. The spatially-predicted motion vector determination unit 151 supplies spatially-predicted motion vector information containing the spatially-predicted motion vector to the predicted motion vector generation unit 153.

The temporally-predicted motion vector determination unit 152 operates in accordance with the control information supplied from the region size determination unit 142. Specifically, in a case where a temporal prediction is allowed by the region size determination unit 142, the temporally-predicted motion vector determination unit 152 performs a temporal prediction by using the motion information of neighbor regions (neighbor motion information) supplied from the motion information buffer 135, as well as the motion information (the motion vector) about each inter prediction mode supplied from the motion search unit 131. By doing so, the temporally-predicted motion vector determination unit 152 generates a temporally-predicted motion vector (and a spatially- and temporally-predicted motion vector). The temporally-predicted motion vector determination unit 152 supplies temporally-predicted motion vector information containing the generated temporally-predicted motion vector (and the spatially- and temporally-predicted motion vector) to the predicted motion vector generation unit 153.

The predicted motion vector generation unit 153 acquires the spatially-predicted motion vector information supplied from the spatially-predicted motion vector determination unit 151 and the temporally-predicted motion vector information supplied from the temporally-predicted motion vector determination unit 152 with respect to each inter prediction mode. The predicted motion vector generation unit 153 selects the spatially-predicted motion vector information or the temporally-predicted motion vector information, whichever is more suitable for the motion information supplied from the motion search unit 131, with respect to each inter prediction mode. That is, the predicted motion vector generation unit 153 selects (the predicted motion vector information containing) the predicted motion vector more similar to the motion vector of the current region. In a case where a temporal prediction is not performed, only the spatially-predicted motion vector information is supplied, and therefore, the predicted motion vector generation unit 153 selects the spatially-predicted motion vector information.

The predicted motion vector generation unit 153 supplies the selected predicted motion vector information and the motion information about the current region to the difference motion vector generation unit 154 with respect to each inter prediction mode.

The difference motion vector generation unit 154 generates a difference motion vector between the predicted motion vector and the motion vector of the current region by using the information supplied from the predicted motion vector generation unit 153 with respect to each inter prediction mode. The difference motion vector generation unit 154 supplies the difference motion information containing the generated difference motion vector, and the predicted motion vector information to the cost function value generation unit 132.

As described above, the region size determination unit 142 of the temporal prediction control unit 121 controls whether a temporal prediction is to be performed, in accordance with the size of the current region. Accordingly, the motion vector encoding unit 122 can perform a temporal prediction only on a desired region, and can skip temporal predictions on unnecessary regions. As a result, the motion vector encoding unit 122 can prevent unnecessary increases in the memory access load. That is, the image encoding device 100 can prevent increases in the processing load related to image encoding.

It should be noted that limitations are put only on temporal predictions when the present technique is applied. In other words, encoded data does not become irregular data as a result of an application of the present technique. Specifically, encoded data generated by the image encoding device 100 to which the present technique is applied can be more accurately decoded by an image decoding device (hereinafter referred to as a conventional image decoding device) compatible with the image encoding device 100 that is operated not in accordance with the present technique. In a decoding process by the image decoding device, however, the same limitation as that in the encoding is eventually put on temporal predictions (though the procedures in the decoding process are the same as those in a conventional decoding process).

Accordingly, the image encoding device 100 can also prevent increases in the processing load related to image decoding.

As the region size determination unit 142 performs control so that a temporal prediction is not to be performed when the region size of the current region is small, the motion vector encoding unit 122 can skip temporal predictions on small regions leading to an increase in the number of predicted motion vectors, and can prevent unnecessary increases in the memory access load in a more effective manner.

The region size determination unit 142 also determines the size of the current region by using the threshold value. Accordingly, the region size determination unit 142 can easily perform the determination, and prevent increases in the load due to the process to determine the size of the current region.

Further, the threshold setting unit 141 sets the threshold value in accordance with a profile level such as a frame size. Accordingly, the region size determination unit 142 can control temporal predictions in a more suitable manner. For example, for a sequence that has a smaller frame, the throughput required per unit time is low, and accordingly, the degree of necessity to control temporal predictions is not high. Also, a sequence of a smaller frame is smaller than a region (a coding unit) to be used in encoding, and there is a possibility of a decrease in encoding efficiency when generation of predicted motion vectors (predictors) with respect to smaller regions (prediction units) is restricted.

In view of this, the threshold setting unit 141 is designed to prohibit temporal predictions on regions smaller than 16×16 with respect to each sequence having a pixel resolution of 1920×1088, and prohibit temporal predictions on regions smaller than 8×8 with respect to each sequence having a resolution of 720×480. In this manner, the threshold setting unit 141 sets the threshold value so that a greater limitation is put on a sequence of a larger frame, and a smaller limitation is put on a sequence of a smaller frame. Accordingly, the motion vector encoding unit 122 can appropriately remove the bottleneck in real-time actions by memory access.

Encoding Process Flow

Next, flows in respective processes to be performed by the above described image encoding device 100 are described. Referring first to the flowchart shown in FIG. 5, an example flow in an encoding process is described.

In step S101, the A/D converter 101 performs an A/D conversion on an input image. In step S102, the screen rearrangement buffer 102 stores the image subjected to the A/D conversion, and rearranges the respective pictures in encoding order, instead of displaying order.

In step S103, the intra prediction unit 114 performs an intra prediction process. In step S104, the motion prediction/compensation unit 115 performs an inter motion prediction process. In step S105, the predicted image selection unit 116 selects a predicted image generated through an intra prediction or a predicted image generated through an inter prediction.

In step S106, the arithmetic operation unit 103 calculates a difference (or generates a difference image) between the image rearranged through the processing in step S102 and the predicted image selected through the processing in step S105. The data amount of the generated difference image is smaller than that of the original image. Accordingly, the data amount can be made smaller than that in a case where each image is directly encoded.

In step S107, the orthogonal transform unit 104 performs an orthogonal transform on the difference image generated through the processing in step S106. Specifically, an orthogonal transform such as a discrete cosine transform or a Karhunen-Loeve transform is performed, and an orthogonal transform coefficient is output. In step S108, the quantization unit 105 quantizes the orthogonal transform coefficient obtained through the processing in step S107.

The difference image quantized through the processing in step S108 is locally decoded in the following manner. Specifically, in step S109, the inverse quantization unit 108 inversely quantizes the quantized orthogonal transform coefficient (also referred to as the quantized coefficient) generated through the processing in step S108, using properties corresponding to the properties of the quantization unit 105. In step S110, the inverse orthogonal transform unit 109 performs an inverse orthogonal transform on the orthogonal transform coefficient obtained through the processing in step S109, using properties corresponding to the properties of the orthogonal transform unit 104. As a result of this, the difference image is restored.

In step S111, the arithmetic operation unit 110 adds the predicted image selected in step S105 to the difference image generated in step S110, to generate a decoded image that is locally decoded (a reconstructed image). In step S112, the loop filter 111 generates a decoded image by performing a deblocking filtering process and a loop filtering process including an adaptive loop filtering process and the like, where appropriate, on the reconstructed image obtained through the processing in step S111.

In step S113, the frame memory 112 stores the decoded image generated through the processing in step S112 or the reconstructed image generated through the processing in step S111.

In step S114, the lossless encoding unit 106 encodes the orthogonal transform coefficient quantized through the processing in step S108. Specifically, lossless encoding such as variable-length encoding or arithmetic encoding is performed on the difference image. The lossless encoding unit 106 encodes information about the prediction, information about the quantization, information about the filtering process, and the like, and adds the encoded information to the bit stream.

In step S115, the accumulation buffer 107 accumulates the bit stream obtained through the processing in step S114. The encoded data accumulated in the accumulation buffer 107 is read where appropriate, and is transmitted to the decoding side via a transmission path or a recording medium.

In step S116, based on the bit rate (the bit generation rate) of the encoded data accumulated in the accumulation buffer 107 through the processing in step S115, the rate control unit 117 controls the quantization process rate of the quantization unit 105 so as not to cause an overflow or underfloor.

When the processing in step S116 is completed, the encoding operation comes to an end.

Flow in the Inter Motion Prediction Process

Figure 5:
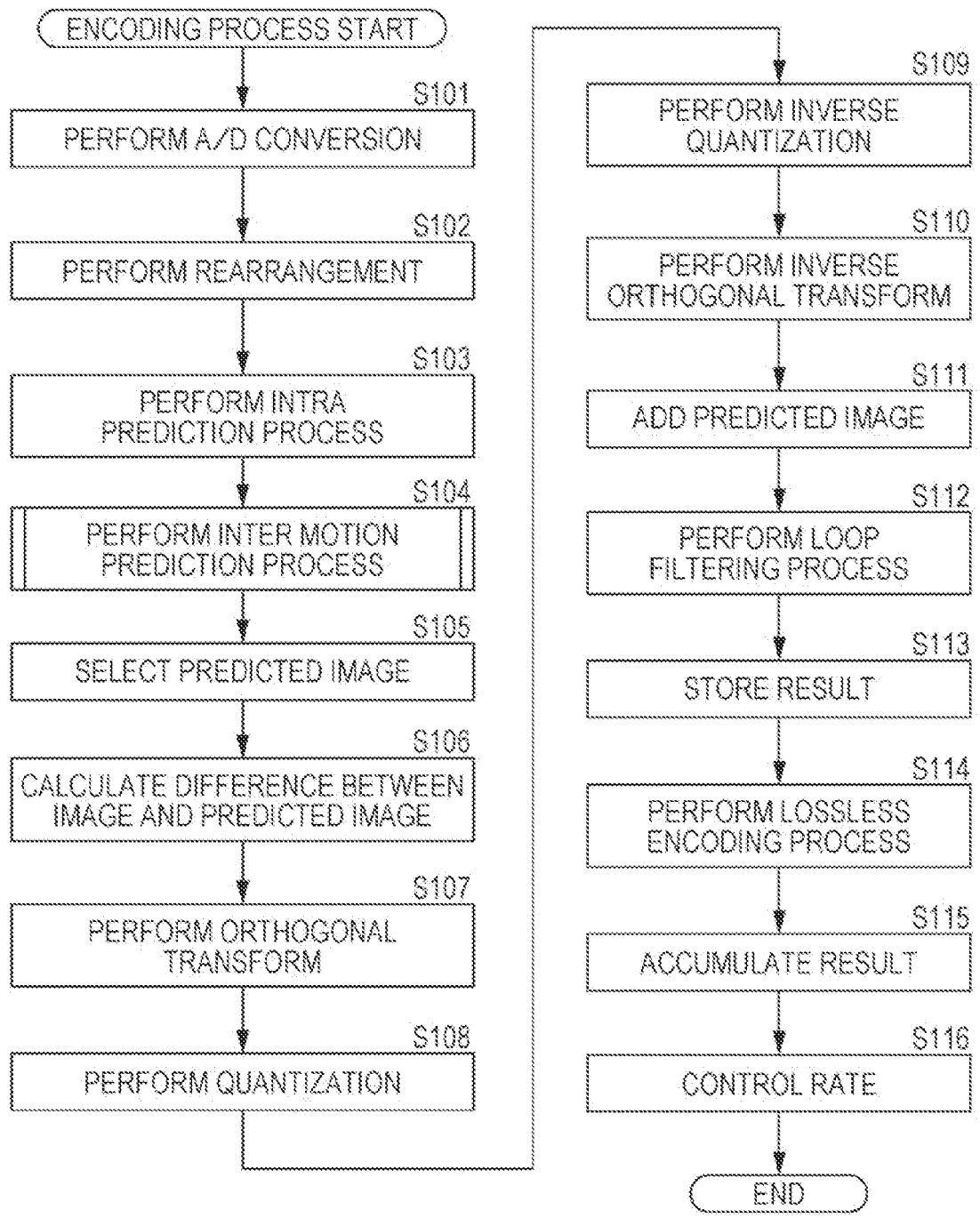
FIG. 5 is a flowchart for explaining an example flow in an encoding process.
Figure 6:
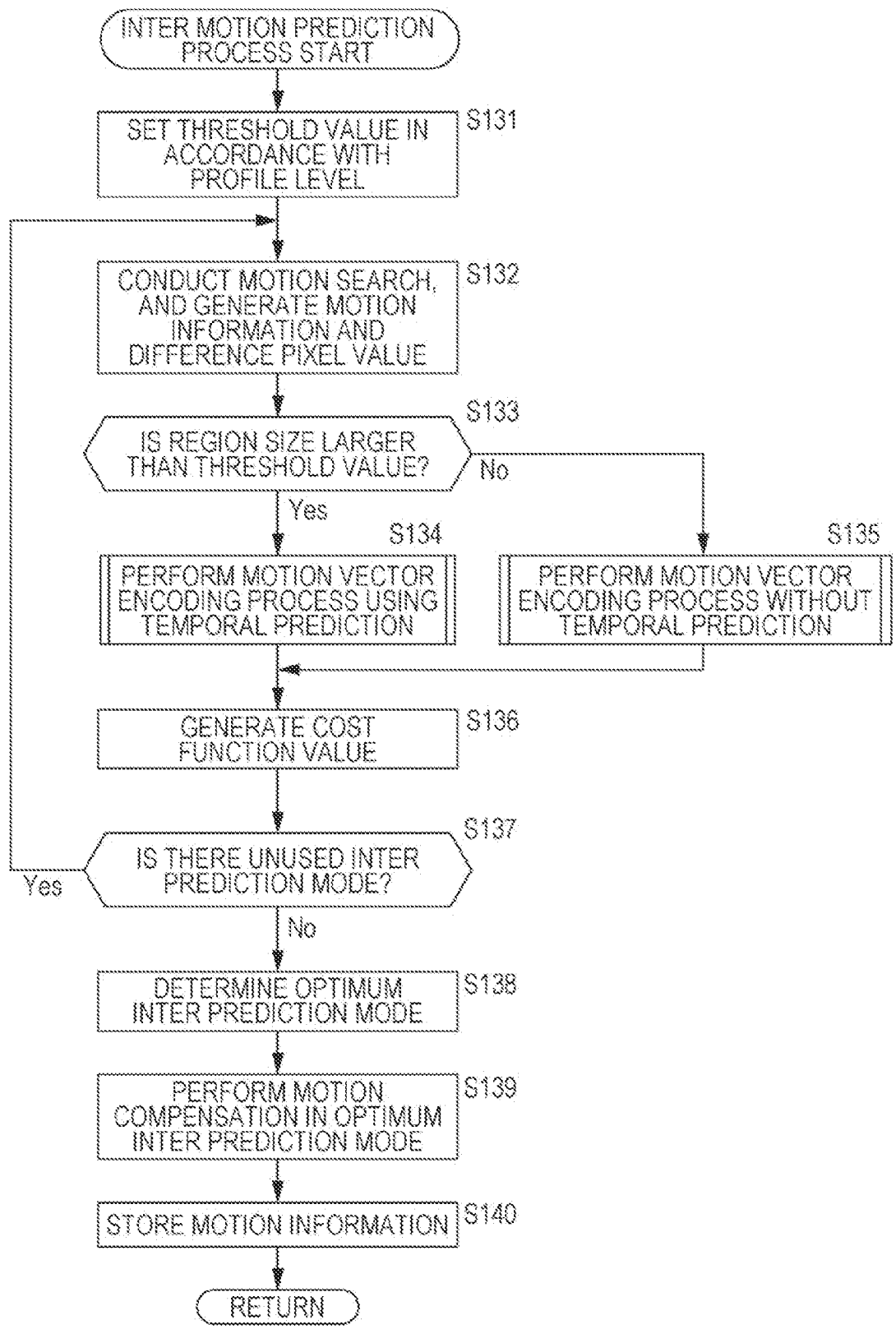
FIG. 6 is a flowchart for explaining an example flow in an inter motion prediction process.

Referring now to the flowchart shown in FIG. 6, an example flow in the inter motion prediction process to be performed in step S104 in FIG. 5 is described.

In step S131, the threshold setting unit 141 sets a threshold value in accordance with a profile level.

In step S132, the motion search unit 131 conducts a motion search, generates motion information about the current region being processed, generates a predicted image by performing a compensation process using the motion information, and further generates a difference image by using the predicted image in each inter prediction mode.

In step S133, the region size determination unit 142 determines whether the size of the current region is larger than the threshold value set in step S131. If the size of the current region is determined to be larger than the threshold value, the region size determination unit 142 advances the process to step S134. In step S134, the motion vector encoding unit 122 performs a motion vector encoding process using a temporal prediction. When the motion vector encoding process using a temporal prediction is completed, the motion vector encoding unit 122 advances the process to step S136.

If the size of the current region is determined to be equal to or smaller than the threshold value in step S133, the region size determination unit 142 advances the process to step S135. In step S135, the motion vector encoding unit 122 performs a motion vector encoding process not using a temporal prediction. When the motion vector encoding process not using a temporal process is completed, the motion vector encoding unit 122 advances the process to step S136.

In step S136, the cost function value generation unit 132 calculates a cost function value by using the pixel value of the difference image generated in step S132.

In step S137, the cost function value generation unit 132 determines whether there is an unused inter prediction mode. If it is determined that there is an unused inter prediction mode, the process is returned to step S132, and the processing thereafter is repeated. That is, the processing in steps S132 through S137 is performed in each inter prediction mode.

After cost function values are generated in all the inter prediction modes, the cost function value generation unit 132 advances the process to step S138. In step S138, the mode determination unit 133 determines an optimum inter prediction mode based on the cost function values of the respective inter prediction modes.

In step S139, the motion compensation unit 134 performs motion compensation in the optimum inter prediction mode determined through the processing in step S138, and generates a predicted image.

In step S140, the motion information buffer 135 and the spatially-predicted motion vector determination unit 151 each store motion information containing the motion vector of the current region used in the motion compensation in step S139. This motion information will be used as spatial neighbor motion information or temporal neighbor motion information in other regions to be processed later than the current region.

When the processing in step S140 is completed, the motion prediction/compensation unit 115 ends the inter motion prediction process, and returns the process to the process shown FIG. 5.

Flow in the Motion Vector Encoding Process Using a Temporal Prediction

Figure 7:
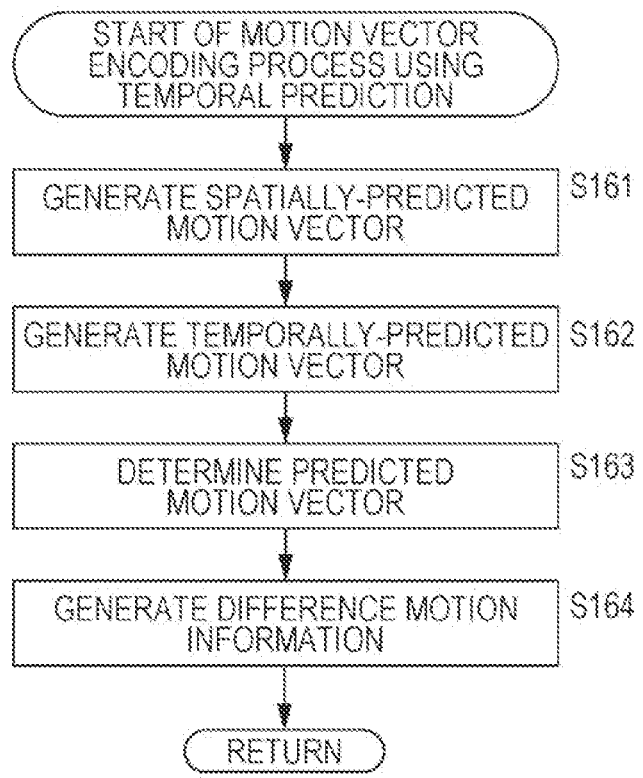
FIG. 7 is a flowchart for explaining an example flow in a motion vector encoding process using a temporal prediction.

Referring now to the flowchart shown in FIG. 7, an example flow in the motion vector encoding process to be performed by using a temporal prediction in step S134 shown in FIG. 6 is described.

When the motion vector encoding process using a temporal prediction is started, the spatially-predicted motion vector determination unit 151 generates a spatially-predicted motion vector in step S161.

In step S162, the temporally-predicted motion vector determination unit 152 generates a temporally-predicted motion vector.

In step S163, the predicted motion vector generation unit 153 determines a predicted motion vector that is the spatially-predicted motion vector generated in step S161 or the temporally-predicted motion vector generated in step S162, whichever is more appropriate or more similar to the motion vector of the current region.

In step S164, the difference motion vector generation unit 154 generates a difference motion vector that is a difference between the predicted motion vector generated in step S163 and the motion vector of the current region, and generates difference motion information containing the difference motion vector.

After generating the difference motion information, the difference motion vector generation unit 154 ends the motion vector encoding process using a temporal prediction, and returns the process to the process shown in FIG. 6.

Flow in the Motion Vector Encoding Process not Using a Temporal Prediction

Figure 8:
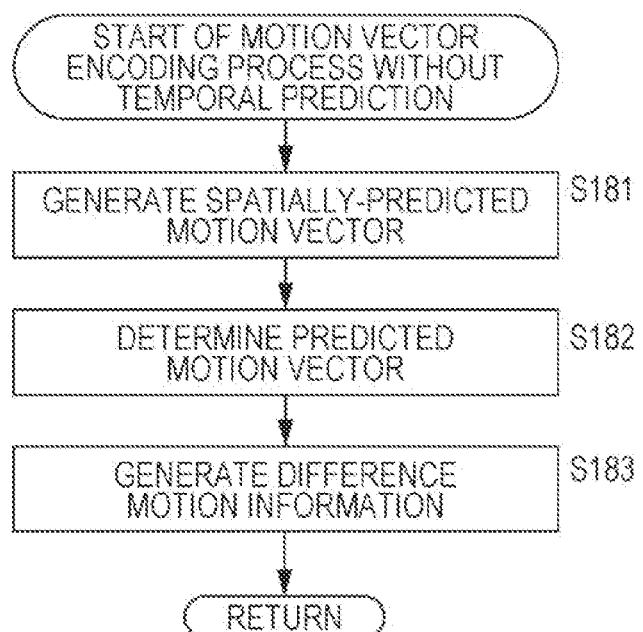
FIG. 8 is a flowchart for explaining an example flow in a motion vector encoding process not using a temporal prediction.

Referring now to the flowchart shown in FIG. 8, an example flow in the motion vector encoding process to be performed by using no temporal predictions in step S135 shown in FIG. 6 is described.

The motion vector encoding process not using a temporal prediction is the same as the motion vector encoding process using a temporal prediction, except that the generation of a temporally-predicted motion vector is skipped. Specifically, step S162 is removed from the steps shown in FIG. 7. That is, the processing in steps S181 through S183 shown in FIG. 8 is performed in the same manner as the processing in step S161, step S163, and step S164 shown in FIG. 7. In the motion vector encoding process not using a temporal prediction, however, any temporally-predicted motion vector is not generated. Therefore, in step S182, the spatially-predicted motion vector generated in step S181 is adopted as a predicted motion vector.

As the respective processes are performed in the above described manner, the image encoding device 100 can prevent increases in the processing load related to image encoding and decoding.

2. Second Embodiment

Limitation on Temporal Predictions in Accordance with the Number of Temporally-Predicted Motion Vectors Temporal predictions may be limited in accordance with the number of generated temporally-predicted motion vectors. For example, in an LCU including the current region being processed (the current LCU) or adjacent LCUs including the current LCU, the number of times a temporally-predicted motion vector (a temporal predictor) appears may be limited (to a number equal to or smaller than a predetermined upper limit).

Figure 9:
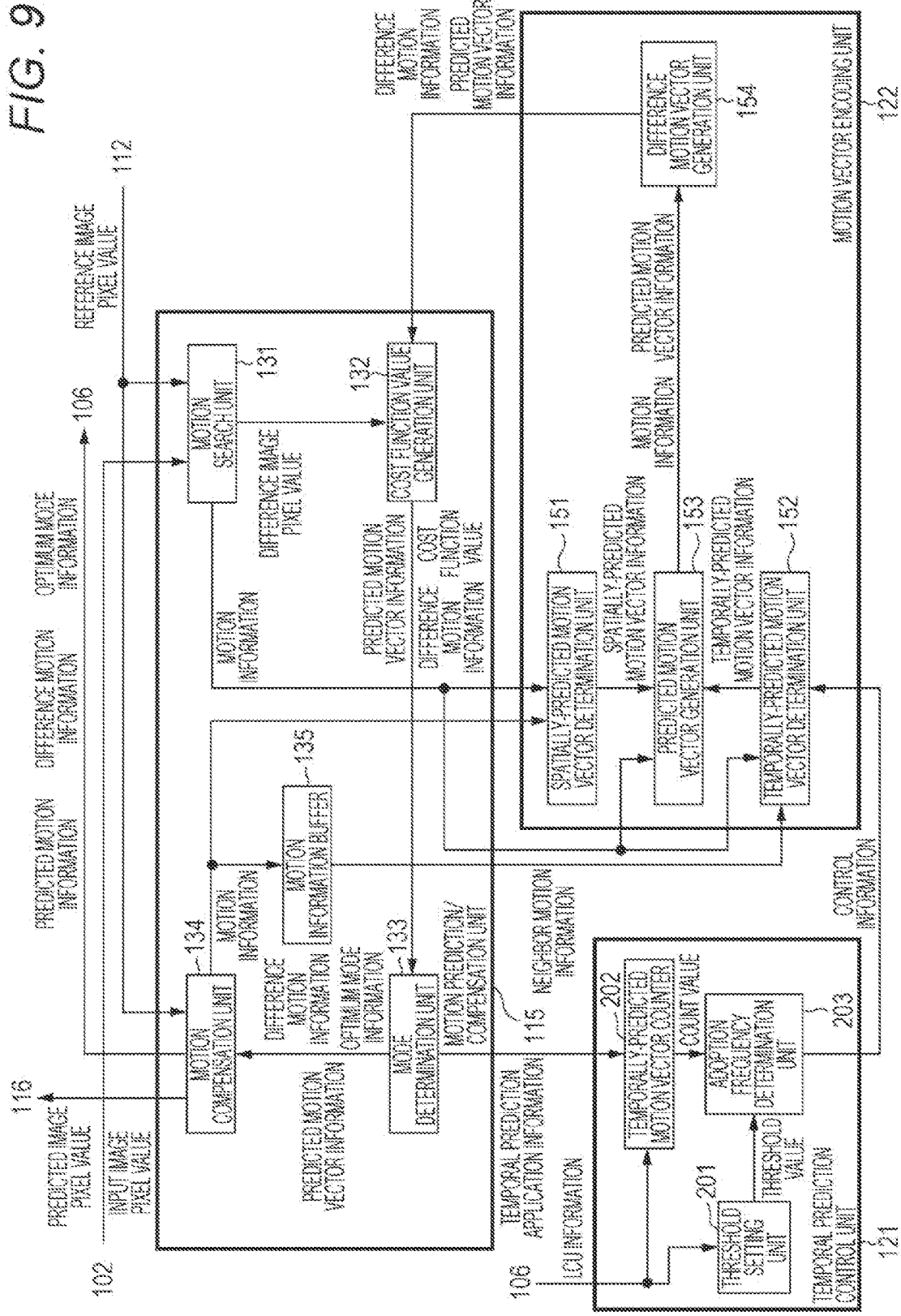
FIG. 9 is a block diagram showing other example structures of the motion prediction/compensation unit, the temporal prediction control unit, and the motion vector encoding unit.

The Motion Prediction/Compensation Unit, the Temporal Prediction Control Unit, and the Motion Vector Encoding Unit FIG. 9 is a block diagram showing typical example structures of the motion prediction/compensation unit 115, the temporal prediction control unit 121, and the motion vector encoding unit 122 in this case.

As shown in FIG. 9, the motion prediction/compensation unit 115 and the motion vector encoding unit 122 have the same structures as those shown in FIG. 4.

The temporal prediction control unit 121 includes a threshold setting unit 201, a temporally-predicted motion vector counter 202, and an adoption frequency determination unit 203. The temporal prediction control unit 121 in this case limits the number of temporally-predicted motion vectors to be generated in each predetermined data unit (such as an LCU). In the following description, each data unit is an LCU.

Based on information about the location and size of the LCU and the like supplied from the lossless encoding unit 106 or the like, the threshold setting unit 201 sets a threshold value in accordance with the LCU size. In a case where the LCU size is 64×64, for example, the threshold setting unit 201 sets the threshold value at N times (N being a natural number). In a case where the LCU size is 32×32, for example, the threshold setting unit 201 sets the threshold value at N/4 times. In a case where the LCU has a size other than the above, the threshold setting unit 201 sets the threshold value in proportion to N. Any value may of course be set, but it is desirable to set a smaller threshold value for a smaller LCU size. That is, when the LCU size is small, the total number of LCUs is larger than that in a case where the LCU size is large. If the number of temporally-predicted motion vectors to be generated in one LCU is the same, the memory access might increase. Therefore, it is desirable to put a greater limitation (or put a smaller upper limit value)

on the number of temporally-predicted motion vectors to be generated for a smaller LCU. In other words, by setting the threshold value in accordance with the LCU size as described above, the threshold setting unit 201 can perform more accurate control on the number of temporally-predicted motion vectors to be generated.

Further, the threshold setting unit 201 determines the threshold value related to the number of temporally-predicted motion vectors to be generated, in accordance with a profile level such as the image size, like the threshold setting unit 141. That is, the threshold setting unit 201 determines the above described number N in accordance with a profile level.

The threshold setting unit 201 supplies the set threshold value to the adoption frequency determination unit 203.

The temporally-predicted motion vector counter 202 acquires, from the mode determination unit 133, information (temporal prediction adoption information) indicating whether the predicted motion vector of the inter prediction mode selected as the optimum mode by the mode determination unit 133 is a temporally-predicted motion vector.

Specifically, after selecting an optimum mode based on cost function values, the mode determination unit 133 supplies the information (the temporal prediction adoption information) indicating whether the predicted motion vector of the inter prediction mode is a temporally-predicted motion vector, to the temporally-predicted motion vector counter 202.

Based on the temporal prediction adoption information acquired from the mode determination unit 133, the temporally-predicted motion vector counter 202 counts the number of times a temporally-predicted motion vector has been generated (or the number of times a temporally-predicted motion vector has been adopted as the predicted motion vector of an optimum mode). The count value is reset for each LCU that is a predetermined data unit. LCU information is supplied from the lossless encoding unit 106 or the like to the temporally-predicted motion vector counter 202. In accordance with the LCU information, the temporally-predicted motion vector counter 202 determines whether the LCU to which the current region belongs is the same as the LCU to which the previous region belongs. When determining that LCUs have been changed, the temporally-predicted motion vector counter 202 resets the count value.

Every time a temporally-predicted motion vector is generated and counted, the temporally-predicted motion vector counter 202 supplies the count value to the adoption frequency determination unit 203.

The adoption frequency determination unit 203 determines the number of times a temporally-predicted motion vector has been generated, and, in accordance with the number of times, controls the determination as to whether a temporal prediction is to be performed. More specifically, the adoption frequency determination unit 203 performs a determination (a threshold determination) on the number of times a temporally-predicted motion vector has been generated, by using the threshold value set by the threshold setting unit 201. That is, the adoption frequency determination unit 203 determines whether the count value (the number of times a temporally-predicted motion vector has been generated) supplied from the temporally-predicted motion vector counter 202 has reached the threshold value (the upper limit value) set by the threshold setting unit 201.

In accordance with the result of the determination, the adoption frequency determination unit 203 controls whether a temporal prediction is to be performed. In a case where the number of times a temporally-predicted motion vector has been generated is smaller than the threshold value, for example, the adoption frequency determination unit 203 performs control so that a temporal prediction is to be performed in predicting (encoding) a motion vector. Also, in a case where the number of times a temporally-predicted motion vector has been generated has reached the threshold value, the adoption frequency determination unit 203 performs control so that a temporal prediction is not to be performed in predicting (encoding) a motion vector.

Like the region size determination unit 142, the adoption frequency determination unit 203 controls the operation (to determine whether a temporal prediction is to be performed) of the temporally-predicted motion vector determination unit 152, by supplying the control information indicating whether a temporal prediction is to be performed to the temporally-predicted motion vector determination unit 152.

Under such control, the respective components of the motion vector encoding unit 122 operate in the same manner as in the case illustrated in FIG. 4, and generate difference motion information and predicted motion vector information.

Accordingly, in this case, the adoption frequency determination unit 203 of the temporal prediction control unit 121 also controls whether a temporal prediction is to be performed, in accordance with the number of times a temporally-predicted motion vector has been generated. Thus, the motion vector encoding unit 122 can limit the number of temporal prediction to a predetermined number of times or less. Accordingly, the motion vector encoding unit 122 can prevent unnecessary increases in the memory access load. That is, the image encoding device 100 can prevent increases in the processing load related to image encoding.

In this case, encoded data generated by the image encoding device 100 to which the present technique is applied can also be more accurately decoded by a conventional image decoding device. Accordingly, the image encoding device 100 can also prevent increases in the processing load related to image decoding in this case.

As the adoption frequency determination unit 203 determines the size of the current region by using the threshold value. Accordingly, the determination can be made easier, and increases in the load due to the process to determine the size of the current region can be prevented. Furthermore, the threshold setting unit 201 sets the threshold value in accordance with a profile level such as a frame size. Accordingly, the adoption frequency determination unit 203 can control temporal predictions in a more appropriate manner, as in the case illustrated in FIG. 4.

Flow in the Inter Motion Prediction Process

The encoding process in this case is the same as that described above with reference to the flowchart shown in FIG. 5, and therefore, explanation of the encoding process is not repeated herein.

Figure 10:
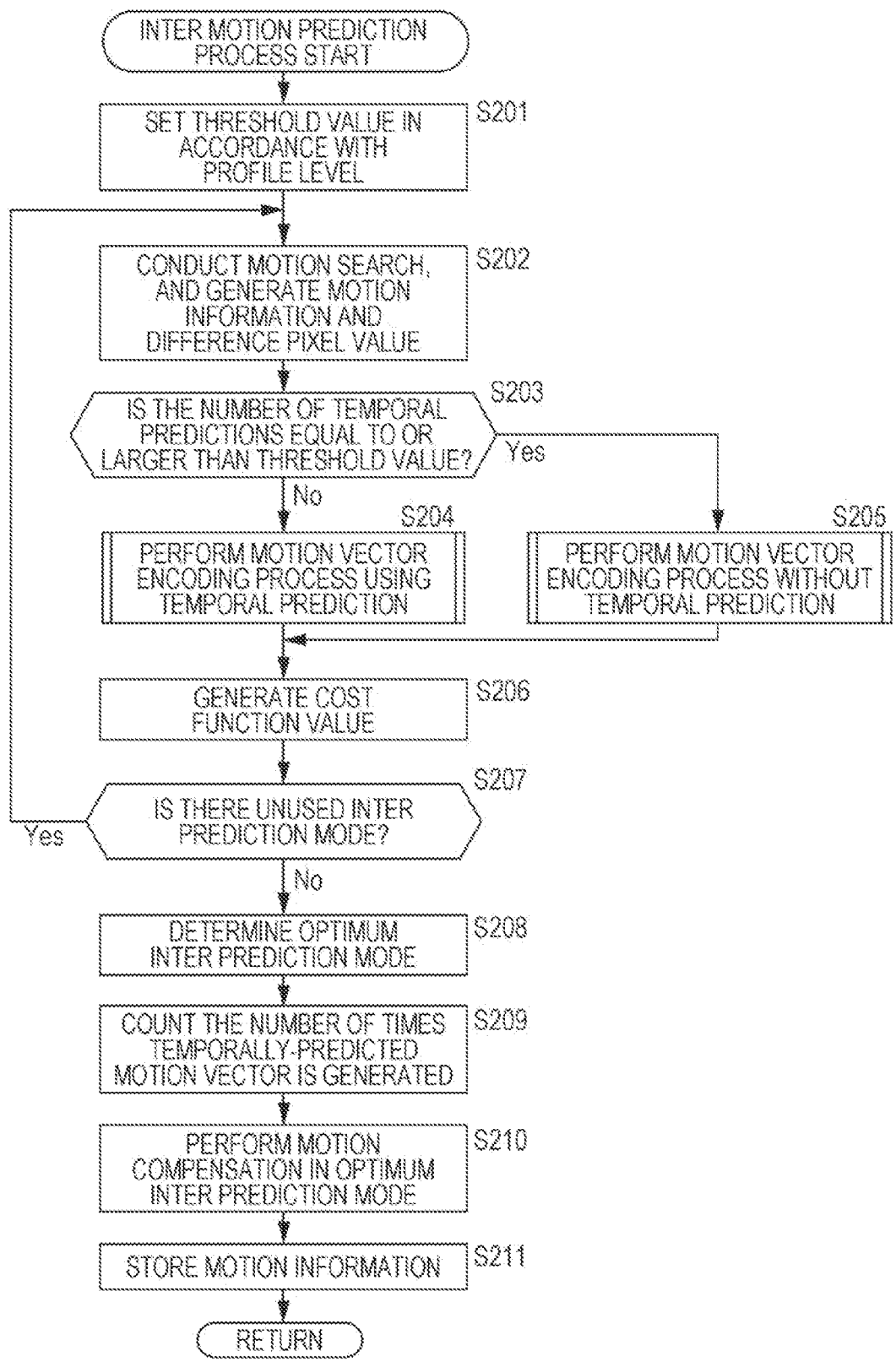
FIG. 10 is a flowchart for explaining another example flow in an inter motion prediction process.

Referring now to the flowchart shown in FIG. 10, an example flow in the inter motion prediction process to be performed in step S104 in FIG. 5 is described.

When the inter motion prediction process is started, the threshold setting unit 201 sets a threshold value in accordance with a profile level in step S201.

In step S202, the motion search unit 131 conducts a motion search, generates motion information about the current region being processed, generates a predicted image by performing a compensation process using the motion information, and further generates a difference image by using the predicted image in each inter prediction mode.

In step S203, the adoption frequency determination unit 203 determines whether the number of times a temporally-predicted motion vector has been adopted in an optimum mode (or the count value counted in the later described step S209) is equal to or larger than the threshold value set in step S203. If the number of times is determined to be smaller than the threshold value (or if the number of times has not reached the threshold value), the adoption frequency determination unit 203 advances the process to step S204.

In step S204, the motion vector encoding unit 122 performs a motion vector encoding process using a temporal prediction, as in the case described above with reference to the flowchart shown in FIG. 7. When the motion vector encoding process using a temporal prediction is completed, the motion vector encoding unit 122 advances the process to step S206.

If the number of times a temporally-predicted motion vector has been adopted in an optimum mode (or the count value counted in the later described step S209) is determined to be equal to or larger than the threshold value (or if the number of times has reached the threshold value) in step S203, the adoption frequency determination unit 203 advances the process to step S205.

In step S205, the motion vector encoding unit 122 performs a motion vector encoding process not using a temporal prediction, as in the case described above with reference to the flowchart shown in FIG. 8. When the motion vector encoding process not using a temporal prediction is completed, the motion vector encoding unit 122 advances the process to step S206.

In step S206, the cost function value generation unit 132 calculates a cost function value by using the pixel value of the difference image generated in step S202.

In step S207, the cost function value generation unit 132 determines whether there is an unused inter prediction mode. If it is determined that there is an unused inter prediction mode, the process is returned to step S202, and the processing thereafter is repeated. That is, the processing in steps S202 through S207 is performed in each inter prediction mode.

After cost function values are generated in all the inter prediction modes, the cost function value generation unit 132 advances the process to step S208. In step S208, the mode determination unit 133 determines an optimum inter prediction mode based on the cost function values of the respective inter prediction modes.

In step S209, the temporally-predicted motion vector counter 202 counts the number of times a temporally-predicted motion vector has been generated. Specifically, the temporally-predicted motion vector counter 202 increases the count (or increments the count value by 1) only when the predicted motion vector of the optimum mode determined through the processing in step S208 is a temporally-predicted motion vector. In other words, when the predicted motion vector of the optimum mode is a spatially-predicted motion vector, the temporally-predicted motion vector counter 202 does not increment the count value by 1 (or does not count the number of times a spatially-predicted motion vector has been generated).

This count value is reset for each LCU (each predetermined data unit).

In step S210, the motion compensation unit 134 performs motion compensation in the optimum inter prediction mode determined through the processing in step S208, and generates a predicted image.

In step S211, the motion information buffer 135 and the spatially-predicted motion vector determination unit 151 each store motion information containing the motion vector of the current region used in the motion compensation in step S210. This motion information will be used as spatial neighbor motion information or temporal neighbor motion information in other regions to be processed later than the current region.

When the processing in step S211 is completed, the motion prediction/compensation unit 115 ends the inter motion prediction process, and returns the process to the process shown FIG. 5.

As the respective processes are performed in the above described manner, the image encoding device 100 can prevent increases in the processing load related to image encoding and decoding.

Other Examples

In the above description, the count value of the number of times a temporally-predicted motion vector has been generated is reset for each LCU that is a data unit, but this data unit may not be an LCU.

Also, in the above described first and second embodiments, the threshold value is determined in accordance with a profile level, but it is not limited to that and may be a fixed value. In that case, the threshold setting unit 141 and the threshold setting unit 201 store the fixed value, and supplies the fixed value as the threshold value to the region size determination unit 142 or the adoption frequency determination unit 203 at a predetermined time or in response to a request from outside.

A threshold value may also be set in accordance with a user instruction or the like. The threshold setting unit 141 and the threshold setting unit 201 receive a user instruction or the like, and set a threshold value based on the received information. Alternatively, a threshold value may be input directly.

In that case, a threshold value that is set on the encoding side may be incorporated into a sequence parameter set (SPS) or a picture parameter set (PPS) or the like, and be transmitted to the decoding side. This threshold value is used in the later described debug process or the like on the decoding side. In this case, a threshold value that is set by the threshold setting unit 141 and the threshold setting unit 201 is supplied to the lossless encoding unit 106, and the lossless encoding unit 106 incorporates the threshold value into a sequence parameter set or the like.

The load on memory access due to temporal predictions depends not only on the block size but also on the prediction direction in each region (Prediction Unit). Specifically, the load on memory access is larger in a case where temporally-predicted motion vectors (temporal predictors) are used for both List0 and List1 than in a case where temporally-predicted motion vectors (temporal predictors) are used for List0 but not for List1.

Therefore, in the second embodiment, the threshold setting unit 201 may set threshold values with respect to the respective prediction directions of List0 and List1, the temporally-predicted motion vector counter 202 may count the number of times a temporally-predicted motion vector has been generated with respect to each of the prediction directions, and the adoption frequency determination unit 203 may perform a threshold determination on the count value with respect to each of the prediction directions. In this case, when the count value reaches the threshold value with respect to one of the prediction directions of List0 and List1, the adoption frequency determination unit 203 performs control so that a temporal prediction is not to be performed.

Further, in the merge mode disclosed in Non-Patent Document 3, a temporal neighbor region may be set as a candidate to be merged with the current region. That is, temporal predictions may be performed in the merge mode. In that case, whether a temporal prediction is to be performed may be controlled in accordance with the region size, the number of times a temporal neighbor region has been adopted, or the like, as described above in the first and second embodiments.

In that case, the motion vector encoding unit 122 performs a merge determination and generates a flag (such as merge_flag or merge_left_flag), instead of generating difference motion information (predicted motion vector information). However, the control by the temporal prediction control unit 121 is the same as that described in the first and second embodiments.

3. Third Embodiment

Control Depending on Availability of Spatial Neighbor Motion Vectors

In the methods disclosed in Non-Patent Document 2 and Non-Patent Document 3, (0, 0) is set as predicted motion vector information when all the neighbor motion vectors are not available. However, this function does not work in a case where the temporal neighbor motion vectors are available even though all the spatial neighbor motion vectors are not available. In that case, a temporally-predicted motion vector (a temporal predictor) is selected, and the load on memory access might increase due to the selection.

In view of this, in the methods described in the first and second embodiments, (0, 0) may be set as predicted motion vector information in a case where all the spatial neighbor motion vectors are not available even though the temporal neighbor motion vectors are available.

Flow in a Motion Vector Encoding Process Using a Temporal Prediction

Figure 11:
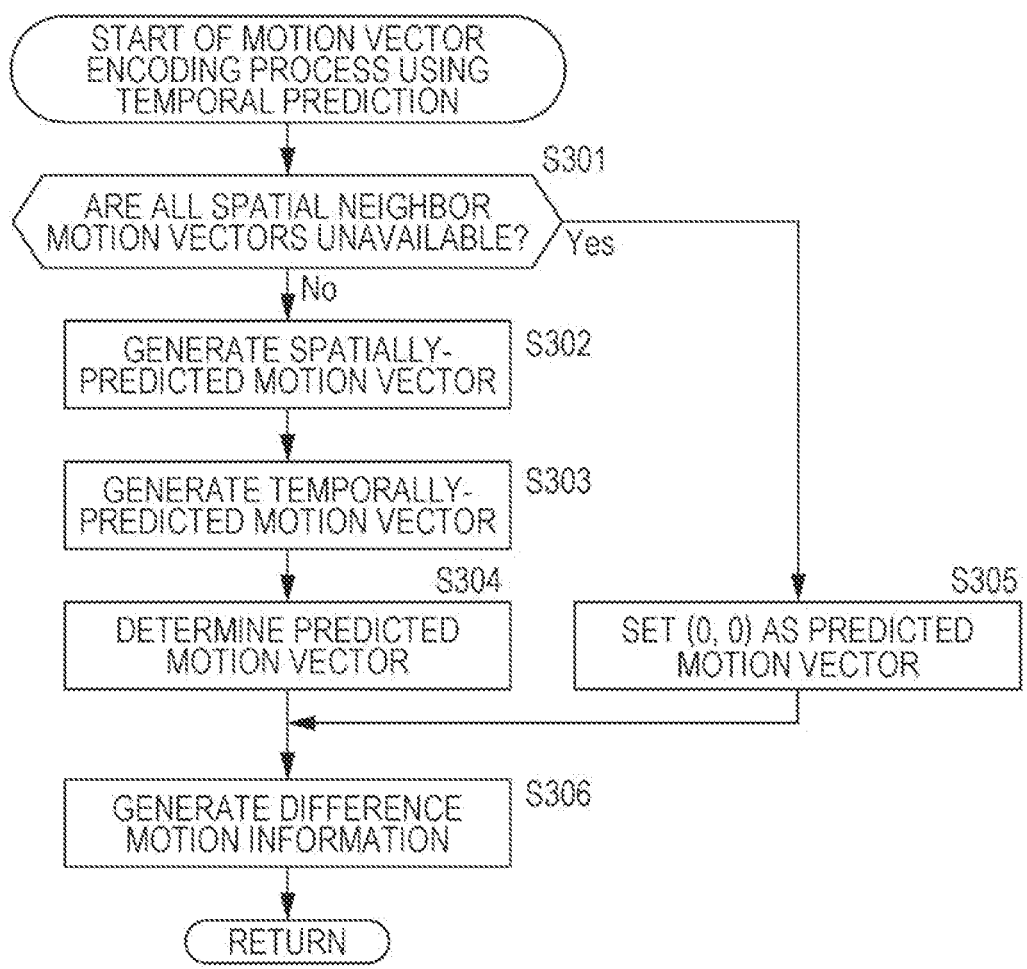
FIG. 11 is a flowchart for explaining another example flow in a motion vector encoding process using a temporal prediction.

Referring now to the flowchart shown in FIG. 11, an example flow in the motion vector encoding process to be performed in that case by using a temporal prediction is described.

When the motion vector encoding process using a temporal prediction is started, the spatially-predicted motion vector determination unit 151 in step S301 determines whether all the spatial neighbor motion vectors are unavailable. If it is determined that there is an available spatial neighbor motion vector, the spatially-predicted motion vector determination unit 151 advances the process to step S302.

In step S302, the spatially-predicted motion vector determination unit 151 generates a spatially-predicted motion vector by using the available spatial neighbor motion vector.

In step S303, the temporally-predicted motion vector determination unit 152 generates a temporally-predicted motion vector.

In step S304, the predicted motion vector generation unit 153 determines a predicted motion vector that is the spatially-predicted motion vector generated in step S302 or the temporally-predicted motion vector generated in step S303, whichever is more appropriate or more similar to the motion vector of the current region. After determining the predicted motion vector, the predicted motion vector generation unit 153 advances the process to step S306.

If it is determined in step S301 that all the spatial neighbor motion vectors are unavailable, the spatially-predicted motion vector determination unit 151 advances the process to step S305. In step S305, the predicted motion vector generation unit 153 sets (0, 0), or a zero vector, as the predicted motion vector. After determining the predicted motion vector, the predicted motion vector generation unit 153 advances the process to step S306.

In step S306, the difference motion vector generation unit 154 generates a difference motion vector that is a difference between the predicted motion vector generated in step S304 or S305 and the motion vector of the current region, and generates difference motion information containing the difference motion vector.

After generating the difference motion information, the difference motion vector generation unit 154 ends the motion vector encoding process using a temporal prediction, and returns the process to the process shown in FIG. 6.

By performing such a process, the motion vector encoding unit 122 can exclude temporally-predicted motion vectors (temporal predictors) from predicted motion vector information about the candidate modes in a case where all the spatial neighbor motion vectors are not available even though the temporal neighbor motion vectors are available. Accordingly, the motion vector encoding unit 122 can prevent increases in the load on memory access.

The predicted motion information contains a code number indicating the type of the predicted motion vector. In a case where the temporal prediction control unit 121 performs control so that a temporal prediction is not to be performed as described in the first through third embodiments, temporally-predicted motion vectors may be excluded from the code number assignment table. In this manner, spatially-predicted motion vectors can be assigned in ascending order of code numbers. As the bit rate is smaller for a smaller code number, encoding efficiency can be increased with this arrangement.

In this case, however, the same switching control as that on the encoding side is required for switching code number assignment tables on the decoding side. Also, more than one type of code number assignment table needs to be prepared on both the encoding side and the decoding side (the same set of tables needs to be prepared for each of the encoding side and the decoding side). Alternatively, code number assignment tables that are prepared on the encoding side may be transmitted to the decoding side.

4. Fourth Embodiment

Predicted Motion Vector Check

When encoding is performed, encoded data (a bit stream) may be analyzed on the decoding side to check whether temporal predictions have been limited in accordance with a standard that specifies the above described limitation. For example, the check result may be used in a debug process.

Image Decoding Device

Figure 12:
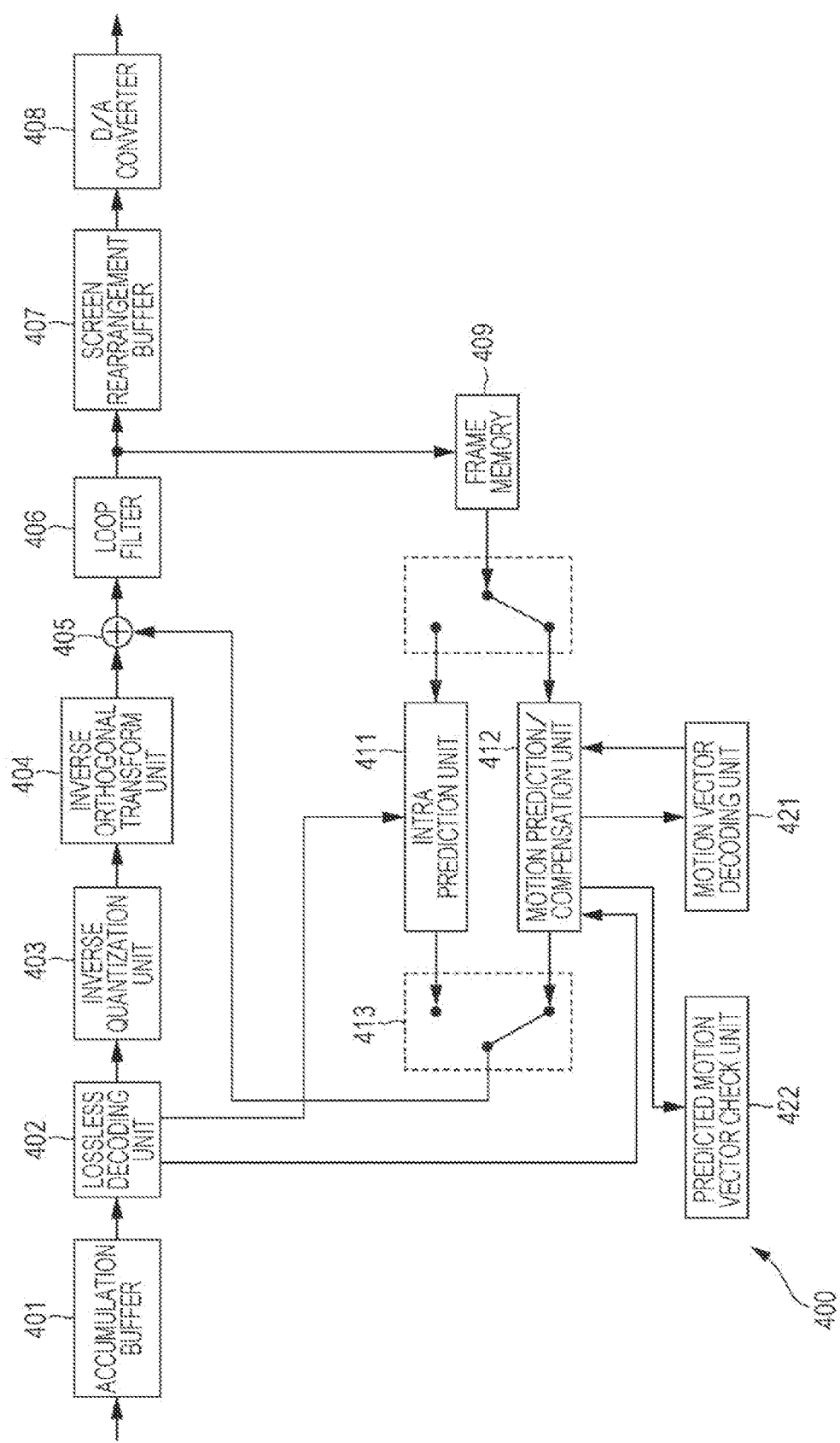
FIG. 12 is a block diagram showing a typical example structure of an image decoding device.

FIG. 12 is a block diagram showing a typical example structure of an image decoding device that is an image processing device. The image decoding device 400 shown in FIG. 12 is a device compatible with the image encoding device 100 shown in FIG. 1. That is, by a decoding method compatible with the encoding method used by the image encoding device 100, the image decoding device 400 decodes encoded data (a bit stream) generated by the image encoding device 100 encoding an image, and obtains a decoded image.

Further, the image decoding device 400 checks whether encoded data (a bit stream) transmitted from the image encoding device 100 was generated while temporal predictions were limited as defined in an encoding/decoding standard as described in the first embodiment.

As shown in FIG. 12, the image decoding device 400 includes an accumulation buffer 401, a lossless decoding unit 402, an inverse quantization unit 403, an inverse orthogonal transform unit 404, an arithmetic operation unit 405, a loop filter 406, a screen rearrangement buffer 407, and a D/A converter 408. The image decoding device 400 also includes a frame memory 409, a selection unit 410, an intra prediction unit 411, a motion prediction/compensation unit 412, and a selection unit 413.

The image decoding device 400 further includes a motion vector decoding unit 421 and a predicted motion vector check unit 422.

The accumulation buffer 401 accumulates transmitted encoded data, and supplies the encoded data to the lossless decoding unit 402 at a predetermined time. The lossless decoding unit 402 decodes the information that has been encoded by the lossless encoding unit 106 shown in FIG. 1 and has been supplied from the accumulation buffer 401, by a method compatible with the encoding method used by the lossless encoding unit 106. The lossless decoding unit 402 supplies the quantized coefficient data of the difference image obtained through the decoding to the inverse quantization unit 403.

The lossless decoding unit 402 also determines whether an intra prediction mode is selected as an optimum prediction mode or whether an inter prediction mode is selected as an optimum prediction mode, by referring to the information about the optimum prediction mode obtained through the decoding of the encoded data. Based on the determination result, the lossless decoding unit 402 supplies the information about the optimum prediction mode to the intra prediction unit 411 or the motion prediction/compensation unit 412. Specifically, in a case where an intra prediction mode is selected as the optimum prediction mode in the image encoding device 100, for example, intra prediction information or the like that is the information about the optimum prediction mode is supplied to the intra prediction unit 411. In a case where an inter prediction mode is selected as the optimum prediction mode in the image encoding device 100, for example, inter prediction information or the like that is the information about the optimum prediction mode is supplied to the motion prediction/compensation unit 412.

By a method compatible with the quantization method used by the quantization unit 105 shown in FIG. 1, the inverse quantization unit 403 inversely quantizes the quantized coefficient data obtained through the decoding by the lossless decoding unit 402, and supplies the resultant coefficient data to the inverse orthogonal transform unit 404. The inverse orthogonal transform unit 404 performs an inverse orthogonal transform on the coefficient data supplied from the inverse quantization unit 403, by a method compatible with the orthogonal transform method used by the orthogonal transform unit 104 shown in FIG. 1. Through this inverse orthogonal transform process, the inverse orthogonal transform unit 404 obtains a difference image corresponding to the difference image yet to be subjected to the orthogonal transform in the image encoding device 100.

The difference image obtained through the inverse orthogonal transform is supplied to the arithmetic operation unit 405. A predicted image is also supplied to the arithmetic operation unit 405 from the intra prediction unit 411 or the motion prediction/compensation unit 412 via the selection unit 413.

The arithmetic operation unit 405 adds the difference image to the predicted image, and obtains a reconstructed image corresponding to the image prior to the subtraction of the predicted image by the arithmetic operation unit 103 of the image encoding device 100. The arithmetic operation unit 405 supplies the reconstructed image to the loop filter 406.

The loop filter 406 performs a loop filtering process including a deblocking filtering process and an adaptive loop filtering process on the supplied reconstructed image, where appropriate. For example, the loop filter 406 removes block distortions by performing a deblocking filtering process on the reconstructed image. Also, the loop filter 406 improves image quality by performing a loop filtering process using a Wiener filter on the result of the deblocking filtering process (the reconstructed image from which block distortions have been removed), for example.

Alternatively, the loop filter 406 may perform any filtering process other than the above described ones. The loop filter 406 may also perform a filtering process by using a filter coefficient supplied from the image encoding device 100 shown in FIG. 1.

The loop filter 406 supplies the decoded image that is the result of the filtering process, to the screen rearrangement buffer 407 and the frame memory 409. The filtering process by the loop filter 406 may be skipped. Specifically, an output of the arithmetic operation unit 405 may not be subjected to a filtering process, but may be stored into the frame memory 409. For example, the intra prediction unit 411 uses the pixel value of a pixel contained in this image as the pixel value of a neighbor pixel.

The screen rearrangement buffer 407 rearranges the supplied decoded image. Specifically, the frame sequence rearranged in the encoding order by the screen rearrangement buffer 102 shown in FIG. 1 is rearranged in the original displaying order. The D/A converter 408 performs a D/A conversion on the decoded image supplied from the screen rearrangement buffer 407, and outputs the converted image to a display (not shown) to display the image.

The frame memory 409 stores the supplied reconstructed image and decoded image. The frame memory 409 also supplies the stored reconstructed image or decoded image to the intra prediction unit 411 or the motion prediction/compensation unit 412 via the selection unit 410 at a predetermined time or in response to an external request from the intra prediction unit 411 or the motion prediction/compensation unit 412 or the like.

The intra prediction unit 411 performs substantially the same process as that performed by the intra prediction unit 114 shown in FIG. 1. However, the intra prediction unit 411 performs intra predictions only on the regions in which predicted images have been generated through intra predictions at the time of encoding.

The motion prediction/compensation unit 412 performs an inter motion prediction process based on the inter prediction information supplied from the lossless decoding unit 402, and generates a predicted image. Based on the inter prediction information supplied from the lossless decoding unit 402, the motion prediction/compensation unit 412 performs the inter motion prediction process only on the regions on which inter predictions have been performed at the time of encoding.

The motion prediction/compensation unit 412 supplies a generated predicted image to the arithmetic operation unit 405 via the selection unit 413 for each region that is a prediction process unit.

The selection unit 413 supplies the predicted image supplied from the intra prediction unit 411 or the predicted image supplied from the motion prediction/compensation unit 412, to the arithmetic operation unit 405.

From the motion prediction/compensation unit 412, the motion vector decoding unit 421 acquires the predicted motion information supplied from the image encoding device 100, and reconstructs the predicted motion vector to be used by the motion prediction/compensation unit 412.

The predicted motion vector check unit 422 checks whether the image encoding device 100 has generated predicted vectors in compliance with the standard.

Figure 13:
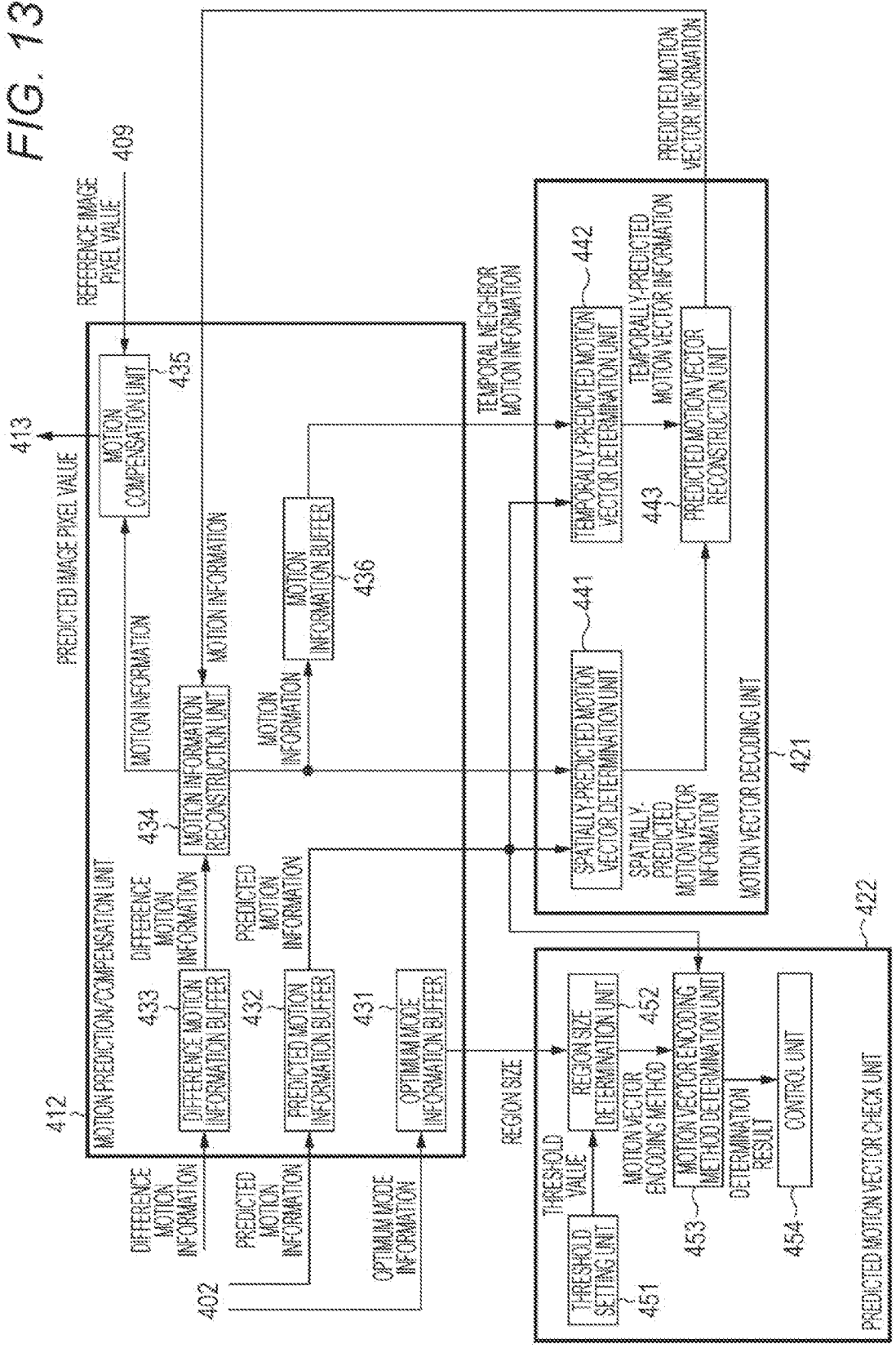
FIG. 13 is a block diagram showing typical example structures of the motion prediction/compensation unit, the motion vector decoding unit, and the predicted motion vector check unit.

The Motion Prediction/Compensation Unit, the Motion Vector Decoding Unit, and the Predicted Motion Vector Check Unit FIG. 13 is a block diagram showing typical example structures of the motion prediction/compensation unit 412, the motion vector decoding unit 421, and the predicted motion vector check unit 422.

As shown in FIG. 13, the motion prediction/compensation unit 412 includes an optimum mode information buffer 431, a predicted motion information buffer 432, a difference motion information buffer 433, a motion information reconstruction unit 434, a motion compensation unit 435, and a motion information buffer 436.

The motion vector decoding unit 421 includes a spatially-predicted motion vector determination unit 441, a temporally-predicted motion vector determination unit 442, and a predicted motion vector reconstruction unit 443.

The optimum mode information buffer 431 acquires and stores optimum mode information that has been extracted from a bit stream and has been supplied from the lossless decoding unit 402. The optimum mode information buffer 431 supplies the stored optimum mode information to a region size determination unit 452 of the predicted motion vector check unit 422 at a predetermined time or in response to a request from outside.

The predicted motion information buffer 432 acquires and stores predicted motion information that has been extracted from the bit stream and has been supplied from the lossless decoding unit 402. The predicted motion information contains information indicating a neighbor region (a temporal neighbor region or a spatial neighbor region) having a motion vector that is to be referred to for generating a predicted motion vector. The predicted motion information buffer 432 supplies the stored predicted motion information to the spatially-predicted motion vector determination unit 441 and the temporally-predicted motion vector determination unit 442 of the motion vector decoding unit 421, and a motion vector encoding method determination unit 453 of the predicted motion vector check unit 422 at a predetermined time or in response to a request from outside.

The difference motion information buffer 433 acquires and stores difference motion information that has been extracted from the bit stream and has been supplied from the lossless decoding unit 402. The difference motion information buffer 433 supplies the stored difference motion information to the motion information reconstruction unit 434 at a predetermined time or in response to a request from outside.

Having acquired the difference motion information about the current region being processed from the difference motion information buffer 433, the motion information reconstruction unit 434 acquires the predicted motion vector information about the current region from the predicted motion vector reconstruction unit 443, and reconstructs the motion information about the current region by using the acquired information. More specifically, the motion information reconstruction unit 434 reconstructs the motion vector of the current region by adding the predicted motion vector indicated by the predicted motion vector information to the difference motion vector indicated by the difference motion information. The motion information reconstruction unit 434 supplies motion information containing the motion vector to the motion compensation unit 435, the motion information buffer 436, and the spatially-predicted motion vector determination unit 441.

The motion compensation unit 435 acquires the motion information about the current region supplied from the motion information reconstruction unit 434. The motion compensation unit 435 also acquires a reference image pixel value supplied from the frame memory 409. The motion compensation unit 435 performs motion compensation by using the acquired information, and generates a predicted image. The motion compensation unit 435 supplies the predicted image pixel value to the arithmetic operation unit 405 via the selection unit 413.

The motion information buffer 436 includes a large-capacity and low-speed storage area such as a DRAM, and stores the motion information supplied from the motion information reconstruction unit 434 into the storage area. This motion information stored in the motion information buffer 436 will be used as temporal neighbor motion information in temporal predictions. That is, the motion information buffer 436 supplies the stored motion information to the temporally-predicted motion vector determination unit 442 of the motion vector decoding unit 421 at a predetermined time or in response to a request from outside.

The spatially-predicted motion vector determination unit 441 of the motion vector decoding unit 421 acquires and stores the motion information supplied from the motion information reconstruction unit 434. The spatially-predicted motion vector determination unit 441 includes a small-capacity and high-speed storage area such as a line buffer, and stores the motion information acquired from the motion information reconstruction unit 434 into the storage area. This motion information will be used as spatial neighbor motion information in spatial predictions.

Of the motion information stored in the spatially-predicted motion vector determination unit 441, motion information with no possibility of being used as spatial neighbor motion information is discarded from the storage area of the spatially-predicted motion vector determination unit 441 at a predetermined time such as when the storage area becomes short of free space. The motion information discarded from the spatially-predicted motion vector determination unit 441 may be supplied to the motion information buffer 436 to store. In that case, the motion information buffer 436 acquires motion information not from the motion information reconstruction unit 434 but from the spatially-predicted motion vector determination unit 441.

Based on the predicted motion information, the spatially-predicted motion vector determination unit 441 performs a spatial prediction by using the stored motion vector, to generate a spatially-predicted motion vector. The spatially-predicted motion vector determination unit 441 supplies spatially-predicted motion vector information containing the spatially-predicted motion vector to the predicted motion vector reconstruction unit 443.

Based on the predicted motion information, the temporally-predicted motion vector determination unit 442 acquires temporal neighbor motion information from the motion information buffer 436, and performs a temporal prediction by using the temporal neighbor motion vector, to generate a temporally-predicted motion vector (and a spatially- and temporally-predicted motion vector). The temporally-predicted motion vector determination unit 442 supplies temporally-predicted motion vector information containing the generated temporally-predicted motion vector (and the spatially- and temporally-predicted motion vector) to the predicted motion vector reconstruction unit 443.

The predicted motion vector reconstruction unit 443 acquires the spatially-predicted motion vector information supplied from the spatially-predicted motion vector determination unit 441 and the temporally-predicted motion vector information supplied from the temporally-predicted motion vector determination unit 442 with respect to each inter prediction mode. The predicted motion vector reconstruction unit 443 selects the spatially-predicted motion vector information or the temporally-predicted motion vector information, whichever is more suitable for the motion information reconstructed by the motion information reconstruction unit 434, with respect to each inter prediction mode. That is, the predicted motion vector reconstruction unit 443 selects (the predicted motion vector information containing) the predicted motion vector more similar to the motion vector of the current region. In a case where a temporal prediction is not performed, only the spatially-predicted motion vector information is supplied, and therefore, the predicted motion vector reconstruction unit 443 selects the spatially-predicted motion vector information.

The predicted motion vector reconstruction unit 443 supplies the selected predicted motion vector information and the motion information about the current region to the motion information reconstruction unit 434 with respect to each inter prediction mode.

The predicted motion vector check unit 422 includes a threshold setting unit 451, the region size determination unit 452, the motion vector encoding method determination unit 453, and a control unit 454.

The threshold setting unit 451 operates in the same manner as the threshold setting unit 141, and sets a threshold value. The region size determination unit 452 acquires information about the region size from the optimum mode information buffer 431, and performs a determination on the region size in the same manner as the region size determination unit 142, by using the threshold value acquired from the threshold setting unit 451. Specifically, in a case where encoding is performed while temporal predictions are limited as described in the first embodiment, the region size determination unit 142 determines whether the predicted motion vector of the current region is a spatially-predicted motion vector or whether the predicted motion vector is a temporally-predicted motion vector based on the size of the current region. The region size determination unit 142 supplies the motion vector encoding method selected as a result of the determination, to the motion vector encoding method determination unit 453.

The motion vector encoding method determination unit 453 determines whether the motion vector encoding method indicated by prediction information matches the result of the determination performed by the region size determination unit 452 (whether the predicted motion vector is a spatially-predicted motion vector or whether the predicted motion vector is a temporally-predicted motion vector). Specifically, the motion vector encoding method determination unit 453 determines whether encoded data acquired from the image encoding device 100 was generated while temporal predictions were limited as described in the first embodiment. In other words, the motion vector encoding method determination unit 453 determines whether temporal predictions for the encoded data acquired from the image encoding device 100 have been limited as described in the first embodiment.

The motion vector encoding method determination unit 453 then notifies the control unit 454 of the result of the determination.

The control unit 454 controls the respective components based on the determination result. More specifically, in a case where the temporal predictions for the encoded data have not been limited as described in the first embodiment, the control unit 454 performs an error process to notify the user to that effect and end the decoding process.

Decoding Process Flow

Next, flows in respective processes to be performed by the above described image decoding device 400 are described. Referring first to the flowchart shown in FIG. 14, an example flow in a decoding process is described.

When the decoding process is started, the accumulation buffer 401 accumulates a transmitted bit stream in step S401. In step S402, the lossless decoding unit 402 decodes the bit stream (encoded difference image information) supplied from the accumulation buffer 401. At this point, various kinds of information other than the difference image information contained in the bit stream, such as intra prediction information or inter prediction information, are also decoded.

In step S403, the inverse quantization unit 403 inversely quantizes the quantized orthogonal transform coefficient obtained through the processing in step S402. In step S404, the inverse orthogonal transform unit 404 performs an inverse orthogonal transform on the orthogonal transform coefficient inversely quantized in step S403.

In step S405, the intra prediction unit 411 or the motion prediction/compensation unit 412 performs a prediction process by using the supplied information. In step S406, the arithmetic operation unit 405 adds the predicted image generated in step S405 to the difference image information obtained through the inverse orthogonal transform in step S404. As a result, a reconstructed image is generated.

In step S407, the loop filter 406 performs a loop filtering process, including a deblocking filtering process, an adaptive loop filtering process, and the like, on the reconstructed image obtained in step S406, where appropriate.

In step S408, the screen rearrangement buffer 407 rearranges the decoded image generated through the filtering process in step S407. Specifically, the order of frames rearranged for encoding by the screen rearrangement buffer 102 of the image encoding device 100 is rearranged in the original displaying order.

In step S409, the D/A converter 408 performs a D/A conversion on the decoded image having the frames rearranged. The decoded image is output to a display (not shown), and is then displayed.

In step S410, the frame memory 409 stores the decoded images obtained through the filtering process in step S407. This decoded image will be used as a reference image in inter prediction processes.

After the processing in step S410 is completed, the decoding process is ended.

Prediction Process Flow

Figure 14:
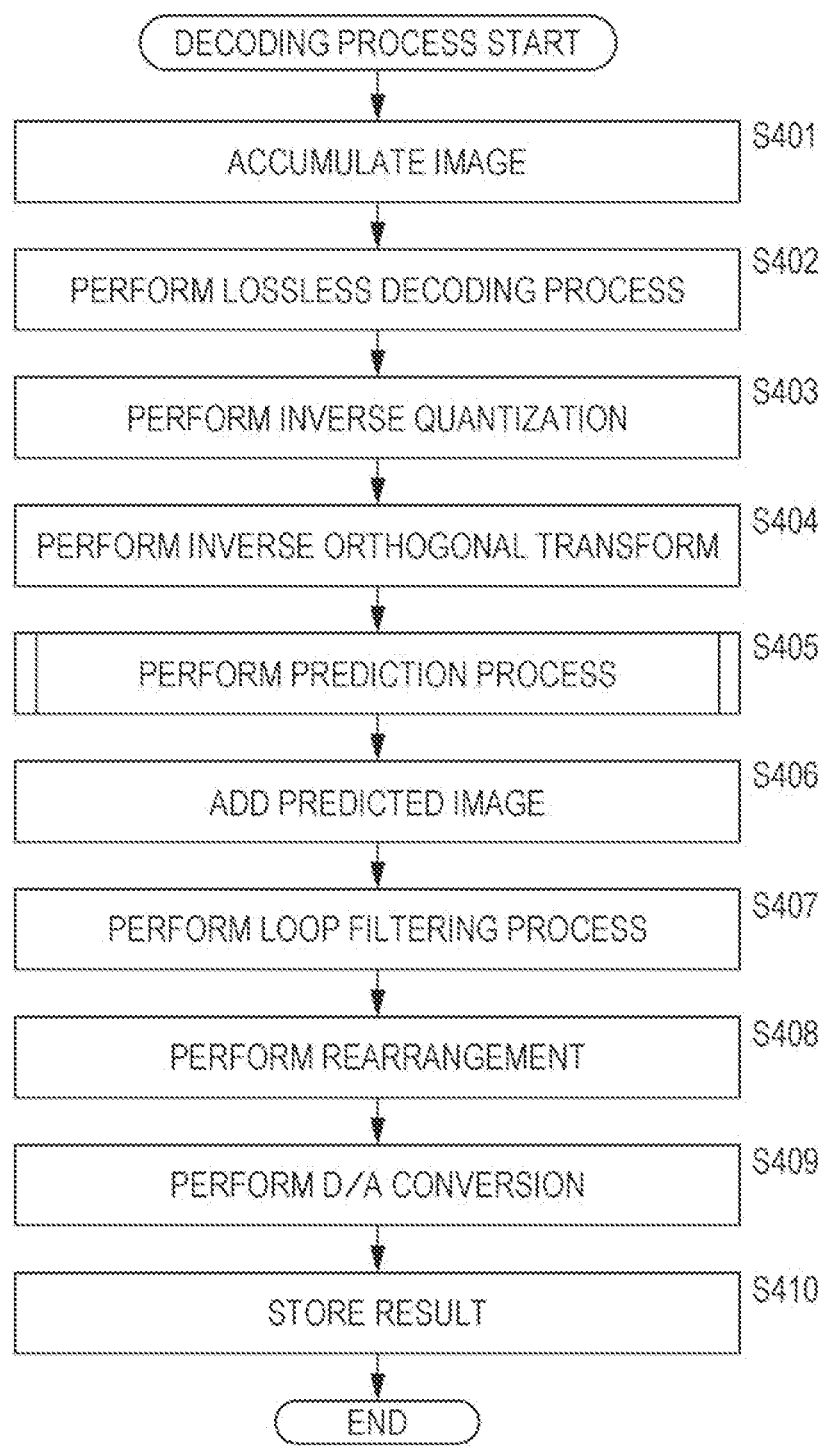
FIG. 14 is a flowchart for explaining an example flow in a decoding process.
Figure 15:
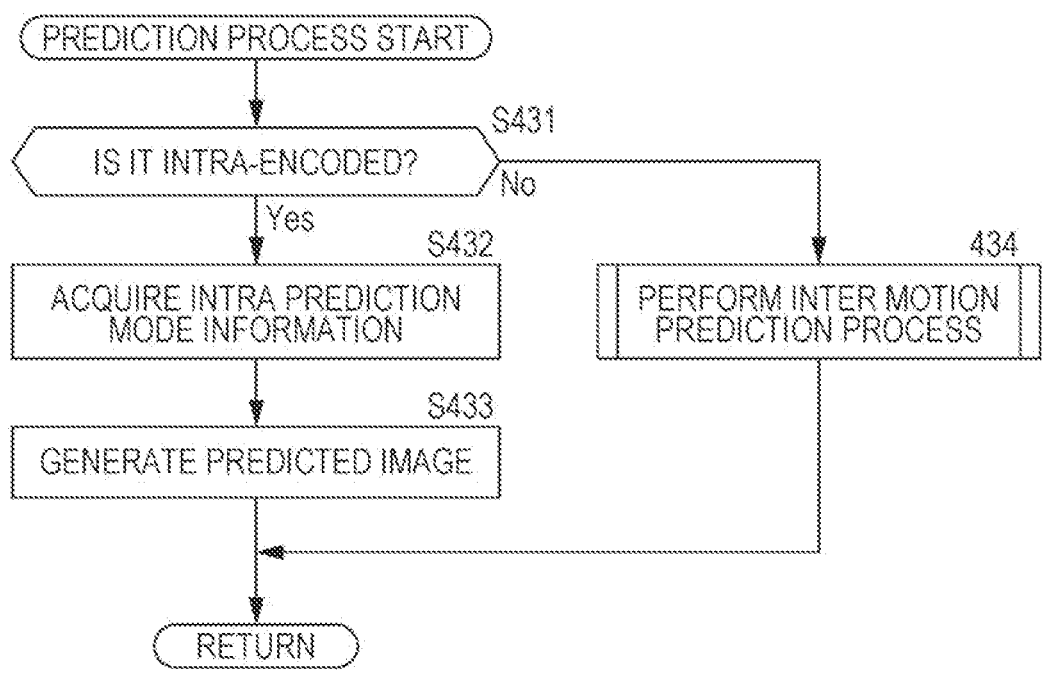
FIG. 15 is a flowchart for explaining an example flow in a prediction process.

Referring now to the flowchart shown in FIG. 15, an example flow in the prediction process to be performed in step S405 shown in FIG. 14 is described.

When the prediction process is started, the lossless decoding unit 402 in step S431 determines whether an intra prediction has been performed on the current region at the time of encoding. If it is determined that an intra prediction has been performed, the lossless decoding unit 402 advances the process to step S432.

In this case, the intra prediction unit 411 acquires intra prediction mode information from the lossless decoding unit 402 in step S432, and generates a predicted image through an intra prediction in step S433. After generating a predicted image, the intra prediction unit 411 ends the prediction process, and returns the process to the process shown in FIG. 14.

If the current region is determined to be a region subjected to an inter prediction in step S431, the lossless decoding unit 402 advances the process to step S434. In step S434, the motion prediction/compensation unit 412 performs an inter motion prediction process. After completing the inter motion prediction process, the motion prediction/compensation unit 412 ends the prediction process, and returns the process to the process shown in FIG. 14.

Flow in the Inter Motion Prediction Process

Figure 16:
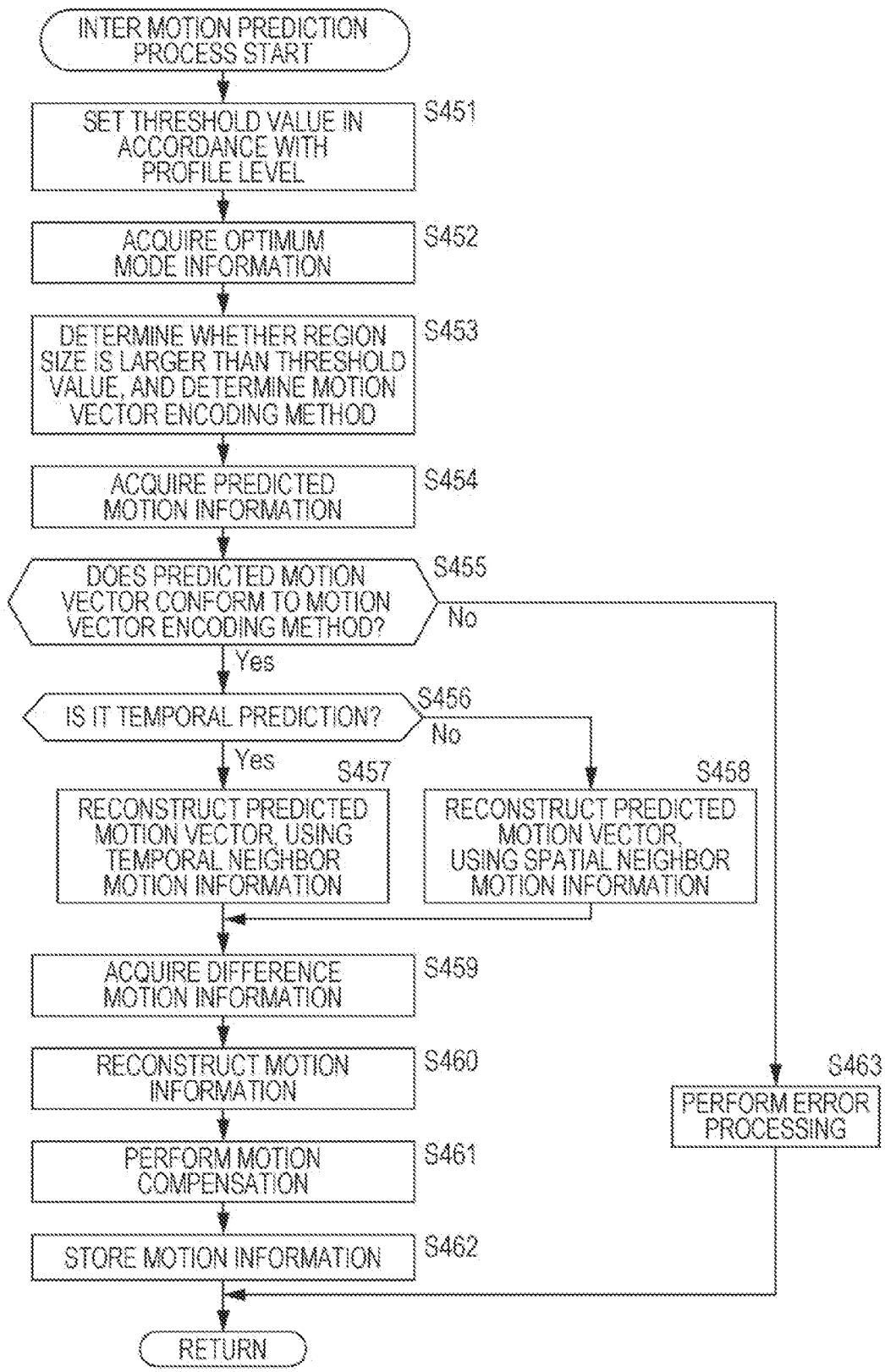
FIG. 16 is a flowchart for explaining an example flow in an inter motion prediction process.

Referring now to the flowchart shown in FIG. 16, an example flow in the inter motion prediction process to be performed in step S434 in FIG. 15 is described.

In step S451, the threshold setting unit 451 sets a threshold value in accordance with a profile level.

In step S452, the optimum mode information buffer 431 acquires optimum mode information extracted from encoded data.

In step S453, the region size determination unit 452 determines whether the size of the current region is larger than the threshold value set in step S451, and determines the motion vector encoding method to be used in a case where the temporal prediction limitation described in the first embodiment is adopted.

In step S454, the predicted motion information buffer 432 acquires predicted motion information extracted from the encoded data.

In step S455, the motion vector encoding method determination unit 453 determines whether the predicted motion vector of the current region indicated by the predicted motion information acquired in step S454 matches the motion vector encoding method determined in step S453. Specifically, the motion vector encoding method determination unit 453 determines whether the motion vector encoding method (a temporal prediction or a spatial prediction) indicated in the encoded data for the current region matches the motion vector encoding method to be used in a case where the temporal prediction limitation described in the first embodiment is adopted.

If it is determined that the predicted motion vector of the current region matches the motion vector encoding method determined in step S453, the motion vector encoding method determination unit 453 advances the process to step S456.

In step S456, the motion vector encoding method determination unit 453 determines whether the motion vector encoding method for the current region is a temporal prediction. If the motion vector encoding method for the current region is determined to be a temporal prediction, the process advances to step S457. In that case, the motion vector decoding unit 421 reconstructs the predicted motion vector by using a temporal prediction in step S457.

If the motion vector encoding method for the current region is determined to be a spatial prediction in step S456, the motion vector encoding method determination unit 453 advances the process to step S458. In that case, the motion vector decoding unit 421 reconstructs the predicted motion vector by using a spatial prediction in step S458.

In step S459, the difference motion information buffer 433 acquires difference motion information. In step S460, the motion information reconstruction unit 434 reconstructs motion information by using the difference motion information acquired in step S459. In step S461, the motion compensation unit 435 performs motion compensation by using the motion information reconstructed in step S460. In step S462, the motion information buffer 436 and the spatially-predicted motion vector determination unit 441 store the motion information reconstructed in step S460. After the processing in step S462 is completed, the motion information buffer 436 and the spatially-predicted motion vector determination unit 441 end the inter motion prediction process.

If it is determined in step S455 that the predicted motion vector of the current region does not match the motion vector encoding method determined in step S453, the motion vector encoding method determination unit 453 advances the process to step S463.

In step S463, the control unit 454 performs error processing to execute predetermined processing to cope with errors, such as notifying the user to that effect or suspending the decoding process. After completing the error processing, the control unit 454 ends the inter motion prediction process.

By performing the respective processes as described above, the image decoding device 400 can correctly check whether the temporal prediction limitation based on the region size has been performed at the time of encoding. Accordingly, a debug process can be performed, and the decoding process can be suspended.

In a case where the temporal prediction limitation based on the number of times a temporally-predicted motion vector has been generated as described in the second embodiment is adopted, the same check as above can be performed.

The present technique can be applied to image encoding devices and image decoding devices that are used when image information (bit streams) compressed through orthogonal transforms such as discrete cosine transforms and motion compensation is received via a network medium such as satellite broadcasting, cable television, the Internet, or a portable telephone device, as in MPEG or H.26x, for example. The present technique can also be applied to image encoding devices and image decoding devices that are used in processing on a storage medium such as an optical or magnetic disk or a flash memory. Further, the present technique can be applied to motion prediction/compensation devices included in such image encoding devices and image decoding devices.

5. Fifth Embodiment

Computer

The above described series of processes can be performed by hardware, and can also be performed by software. When the series of processes are to be performed by software, the programs forming the software are installed in a computer. Here, the computer may be a computer incorporated into special-purpose hardware, or may be a general-purpose personal computer that can execute various kinds of functions when various kinds of programs are installed therein.

Figure 17:
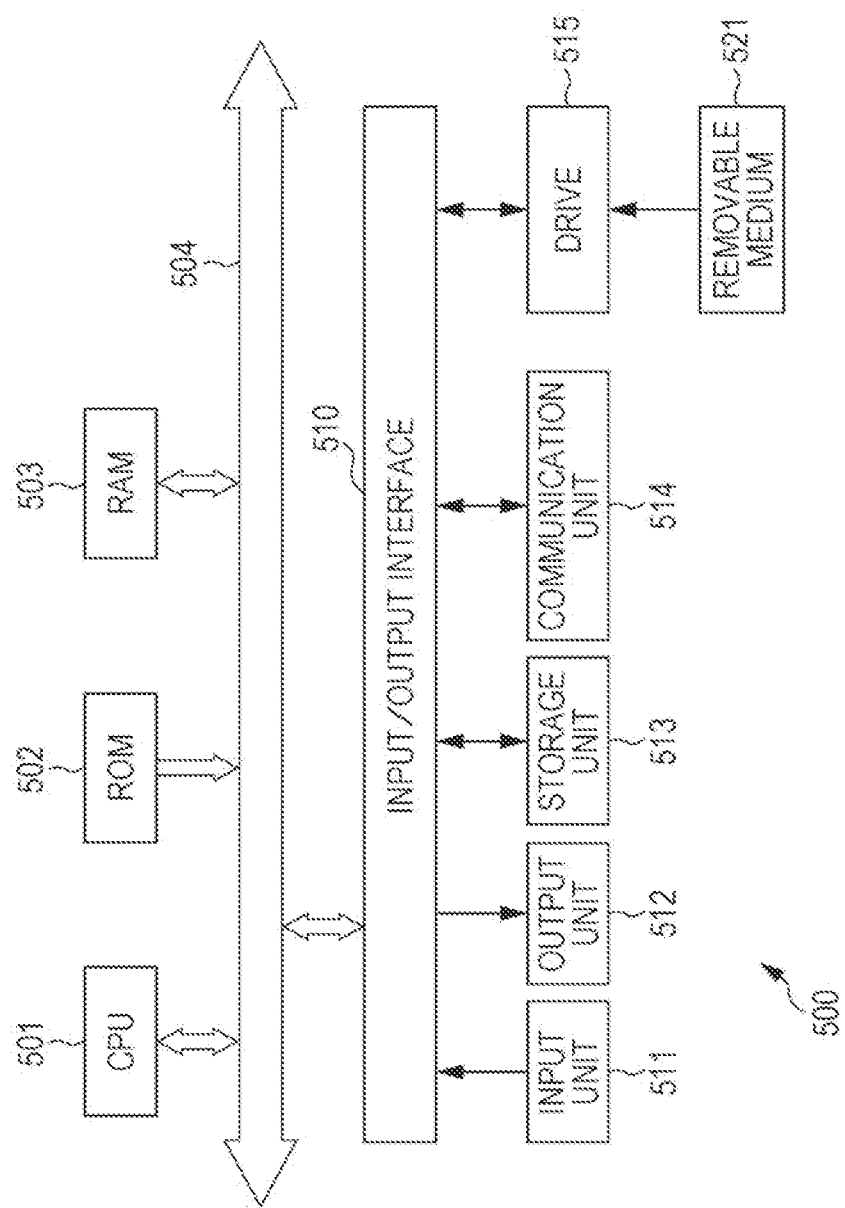
FIG. 17 is a block diagram showing a typical example structure of a personal computer.

In FIG. 17, the CPU (Central Processing Unit) 501 of the personal computer 500 performs various kinds of processes in accordance with a program stored in a ROM (Read Only Memory) 502 or a program loaded into a RAM (Random Access Memory) 503 from a storage unit 513. Data that is necessary for the CPU 501 to perform various kinds of processes is also stored in the RAM 503, where necessary.

The CPU 501, the ROM 502, and the RAM 503 are connected to one another via a bus 504. An input/output interface 510 is also connected to the bus 504.

The input/output interface 510 has the following components connected thereto: an input unit 511 formed with a keyboard, a mouse, or the like; an output unit 512 formed with a display such as a CRT (Cathode Ray Tube) or an LCD (Liquid Crystal Display), a speaker, and the like; the storage unit 513 formed with a hard disk or the like; and a communication unit 514 formed with a modem or the like. The communication unit 514 performs communication processes via networks including the Internet.

A drive 515 is also connected to the input/output interface 510 where necessary, and a removable medium 521 such as a magnetic disk, an optical disk, a magnetooptical disk, or a semiconductor memory is mounted on the drive 515 as appropriate. A computer program read from such a removable medium is installed into the storage unit 513 where necessary.

In a case where the above described series of processes are performed by software, the programs forming the software are installed from a network or a recording medium.

As shown in FIG. 17, this recording medium is formed with the removable medium 521 that is distributed for delivering the programs to users separately from the device, such as a magnetic disk (including a flexible disk), an optical disk (including a CD-ROM (Compact Disc-Read Only Memory) or a DVD (Digital Versatile Disc)), a magnetooptical disk (including an MD (Mini Disc)), or a semiconductor memory, which has the programs recorded thereon. Alternatively, the recording medium may be formed with the ROM 502 having the programs recorded therein or a hard disk included in the storage unit 513. Such a recording medium is incorporated beforehand into the device prior to the delivery to users.

The programs to be executed by the computer may be programs for performing processes in chronological order in accordance with the sequence described in this specification, or may be programs for performing processes in parallel or performing a process when necessary, such as when there is a call for that.

In this specification, the step of writing the programs to be recorded on the recording medium includes not only processes to be performed in chronological order in accordance with the disclosed sequence, but also processes to be performed in parallel or independently of one another if not necessarily in chronological order.

In this specification, a "system" means an entire apparatus formed with two or more devices (apparatuses).

Also, in the above description, any structure described as one device (or one processing unit) may be divided into two or more devices (or processing units). Conversely, any structure described as two or more devices (or processing units) may be combined to form one device (or one processing unit). Also, it is of course possible to add a structure other than the above described ones to the structure of any of the devices (or any of the processing units). Further, as long as the structure and operations of the entire system will remain substantially the same, part of the structure of a device (or a processing unit) may be incorporated into the structure of another device (or another processing unit). That is, embodiments of the present technique are not limited to the above described embodiments, and various modifications may be made to them without departing from the scope of the technique.

The image encoding device and the image decoding device according to the above described embodiments can be applied to various electronic apparatuses including: transmitters and receivers for satellite broadcasting, cable broadcasting such as cable television, deliveries via the Internet, deliveries to terminals by cellular communications, and the like; recording apparatuses that record images on media such as optical disks, magnetic disks, and flash memories; and reproducing apparatuses that reproduce images from those storage media. In the following, four example applications are described.

6. Sixth Embodiment

First Application: Television Receiver

Figure 18:
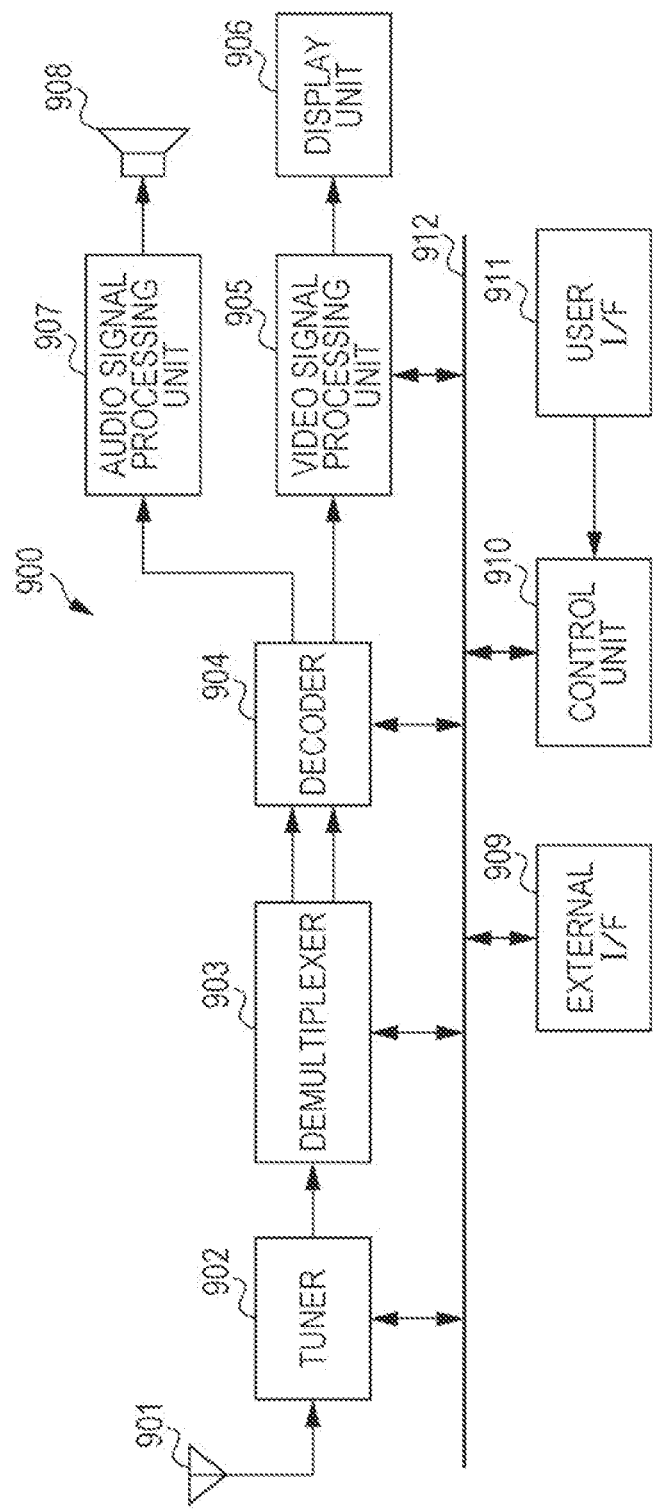
FIG. 18 is a block diagram schematically showing an example structure of a television apparatus.

FIG. 18 schematically shows an example structure of a television apparatus to which the above described embodiments are applied. The television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from broadcast signals received via the antenna 901, and demodulates the extracted signal. The tuner 902 outputs the encoded bit stream obtained through the demodulation to the demultiplexer 903. That is, the tuner 902 serves as a transmission unit in the television apparatus 900 that receives encoded streams formed with encoded images.

The demultiplexer 903 separates the video stream and the audio stream of a show to be viewed from the encoded bit stream, and outputs the respective separated streams to the decoder 904. The demultiplexer 903 also extracts auxiliary data such as an EPG (Electronic Program Guide) from the encoded bit stream, and supplies the extracted data to the control unit 910. In a case where the encoded bit stream has been scrambled, the demultiplexer 903 may perform descrambling.

The decoder 904 decodes the video stream and the audio stream that are input from the demultiplexer 903. The decoder 904 then outputs the video data generated through the decoding process to the video signal processing unit 905. The decoder 904 also outputs the audio data generated through the decoding process to the audio signal processing unit 907.

The video signal processing unit 905 reproduces the video data input from the decoder 904, and causes the display unit 906 to display the video image. Also, the video signal processing unit 905 may cause the display unit 906 to display an application screen that is supplied via a network. Also, the video signal processing unit 905 may perform additional processing such as denoising on the video data in accordance with settings. Further, the video signal processing unit 905 may generate an image of a GUI (Graphical User Interface) such as a menu, a button, or a cursor, and superimpose the generated image on an output image.

The display unit 906 is driven by a drive signal supplied from the video signal processing unit 905, and displays a video image or an image on the video screen of a display device (such as a liquid crystal display, a plasma display, or an OELD (Organic Electro Luminescence Display) (an organic EL display)).

The audio signal processing unit 907 performs a reproduction process such as a D/A conversion and amplification on the audio data that is input from the decoder 904, and outputs sound through the speaker 908. Also, the audio signal processing unit 907 may perform additional processing such as denoising on the audio data.

The external interface 909 is an interface for connecting the television apparatus 900 to an external device or a network. For example, a video stream or an audio stream received via the external interface 909 may be decoded by the decoder 904. That is, the external interface 909 also serves as a transmission unit in the television apparatus 900 that receives encoded streams formed with encoded images.

The control unit 910 includes a processor such as a CPU, and a memory such as a RAM and a ROM. The memory stores the programs to be executed by the CPU, program data, EPG data, data acquired via networks, and the like. The programs stored in the memory are read by the CPU at the time of activation of the television apparatus 900, for example, and are then executed. By executing the programs, the CPU controls operations of the television apparatus 900 in accordance with operating signals that are input through the user interface 911, for example.

The user interface 911 is connected to the control unit 910. The user interface 911 includes buttons and switches for the user to operate the television apparatus 900, and a reception unit for receiving remote control signals, for example. The user interface 911 generates an operating signal by detecting an operation by the user via those components, and outputs the generated operating signal to the control unit 910.

The bus 912 connects the tuner 902, the demultiplexer 903, the decoder 904, the video signal processing unit 905, the audio signal processing unit 907, the external interface 909, and the control unit 910 to one another.

In the television apparatus 900 having the above described structure, the decoder 904 has the functions of the image decoding device according to the above described embodiments. Accordingly, when images are decoded in the television apparatus 900, increases in the load of the decoding process can be prevented.

7. Seventh Embodiment

Second Application: Portable Telephone Device

Figure 19:
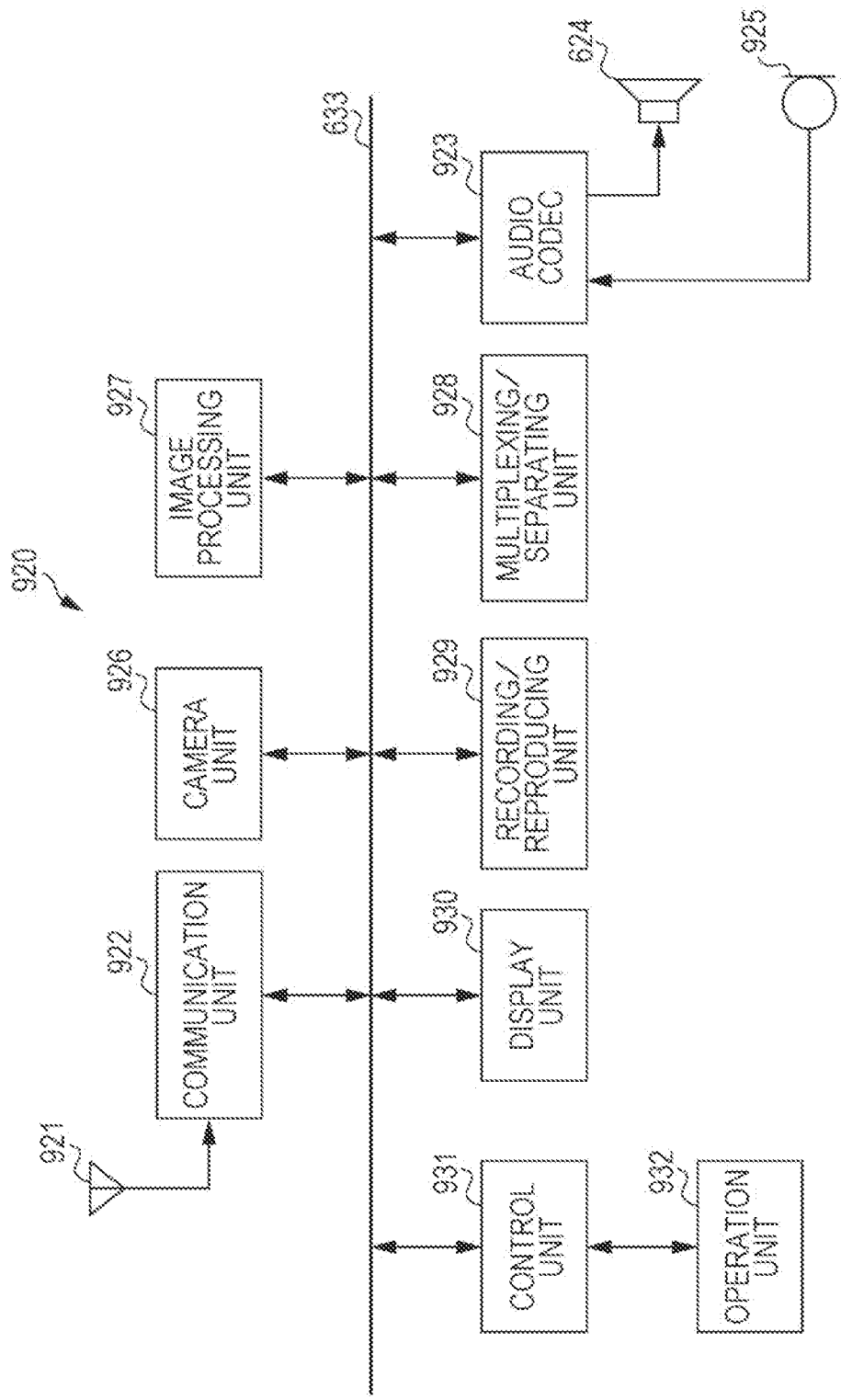
FIG. 19 is a block diagram schematically showing an example structure of a portable telephone device.

FIG. 19 schematically shows an example structure of a portable telephone device to which the above described embodiments are applied. The portable telephone device 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexing/separating unit 928, the recording/reproducing unit 929, the display unit 930, and the control unit 931 to one another.

The portable telephone device 920 performs operations such as transmission and reception of audio signals, transmission and reception of electronic mail or image data, imaging operations, and data recording in various operation modes including an audio communication mode, a data communication mode, an imaging mode, and a videophone mode.

In the audio communication mode, an analog audio signal generated by the microphone 925 is supplied to the audio codec 923. The audio codec 923 converts the analog audio signal to audio data, and performs compression and an A/D conversion on the converted audio data. The audio codec 923 outputs the compressed audio data to the communication unit 922. The communication unit 922 encodes and modulates the audio data, to generate a signal to be transmitted. The communication unit 922 transmits the generated signal to a base station (not shown) via the antenna 921. The communication unit 922 also performs amplification and a frequency conversion on a radio signal that is received via the antenna 921, and obtains a received signal. The communication unit 922 generates audio data by demodulating and decoding the received signal, and outputs the generated audio data to the audio codec 923. The audio codec 923 performs an expansion and a D/A conversion on the audio data, to generate an analog audio signal. The audio codec 923 then outputs the generated audio signal to the speaker 924 to output sound.

In the data communication mode, the control unit 931 generates text data forming an electronic mail in accordance with an operation by the user via the operation unit 932, for example. The control unit 931 causes the display unit 930 to display the text. The control unit 931 also generates electronic mail data in accordance with an instruction transmitted from the user via the operation unit 932, and outputs the generated electronic mail data to the communication unit 922. The communication unit 922 encodes and modulates the electronic mail data, to generate a signal to be transmitted. The communication unit 922 transmits the generated signal to a base station (not shown) via the antenna 921. The communication unit 922 also performs amplification and a frequency conversion on a radio signal received via the antenna 921, and obtains a received signal. The communication unit 922 then restores the electronic mail data by demodulating and decoding the received signal, and outputs the restored electronic mail data to the control unit 931. The control unit 931 causes the display unit 930 to display the contents of the electronic mail, and stores the electronic mail data into the storage medium in the recording/reproducing unit 929.

The recording/reproducing unit 929 includes a readable/rewritable storage medium. For example, the storage medium may be an internal storage medium such as a RAM or a flash memory, or may be a storage medium of an externally mounted type such as a hard disk, a magnetic disk, a magnetooptical disk, an optical disk, a USB (Unallocated Space Bitmap) memory, or a memory card.

In the imaging mode, the camera unit 926 generates image data by capturing an image of an object, and outputs the generated image data to the image processing unit 927. The image processing unit 927 encodes the image data that is input from the camera unit 926, and stores the encoded stream into the storage medium in the recording/reproducing unit 929.

In the videophone mode, the multiplexing/separating unit 928 multiplexes a video stream encoded by the image processing unit 927 and an audio stream input from the audio codec 923, and outputs the multiplexed stream to the communication unit 922. The communication unit 922 encodes and modulates the stream, to generate a signal to be transmitted. The communication unit 922 transmits the generated signal to a base station (not shown) via the antenna 921. The communication unit 922 also performs amplification and a frequency conversion on a radio signal received via the antenna 921, and obtains a received signal. The transmitted signal and the received signal may include an encoded bit stream. The communication unit 922 restores a stream by demodulating and decoding the received signal, and outputs the restored stream to the multiplexing/separating unit 928. The multiplexing/separating unit 928 separates the video stream and the audio stream from the input stream, and outputs the video stream to the image processing unit 927 and the audio stream to the audio codec 923. The image processing unit 927 decodes the video stream, to generate video data. The video data is supplied to the display unit 930, and a series of images are displayed by the display unit 930. The audio codec 923 performs an expansion and a D/A conversion on the audio stream, to generate an analog audio signal. The audio codec 923 then outputs the generated audio signal to the speaker 924 to output sound.

In the portable telephone device 920 having the above described structure, the image processing unit 927 has the functions of the image encoding device and the image decoding device according to the above described embodiments. Accordingly, when images are encoded and decoded in the portable telephone device 920, increases in the load of the encoding process and the decoding process can be prevented.

8. Eighth Embodiment

Third Application: Recording/Reproducing Apparatus

Figure 20:
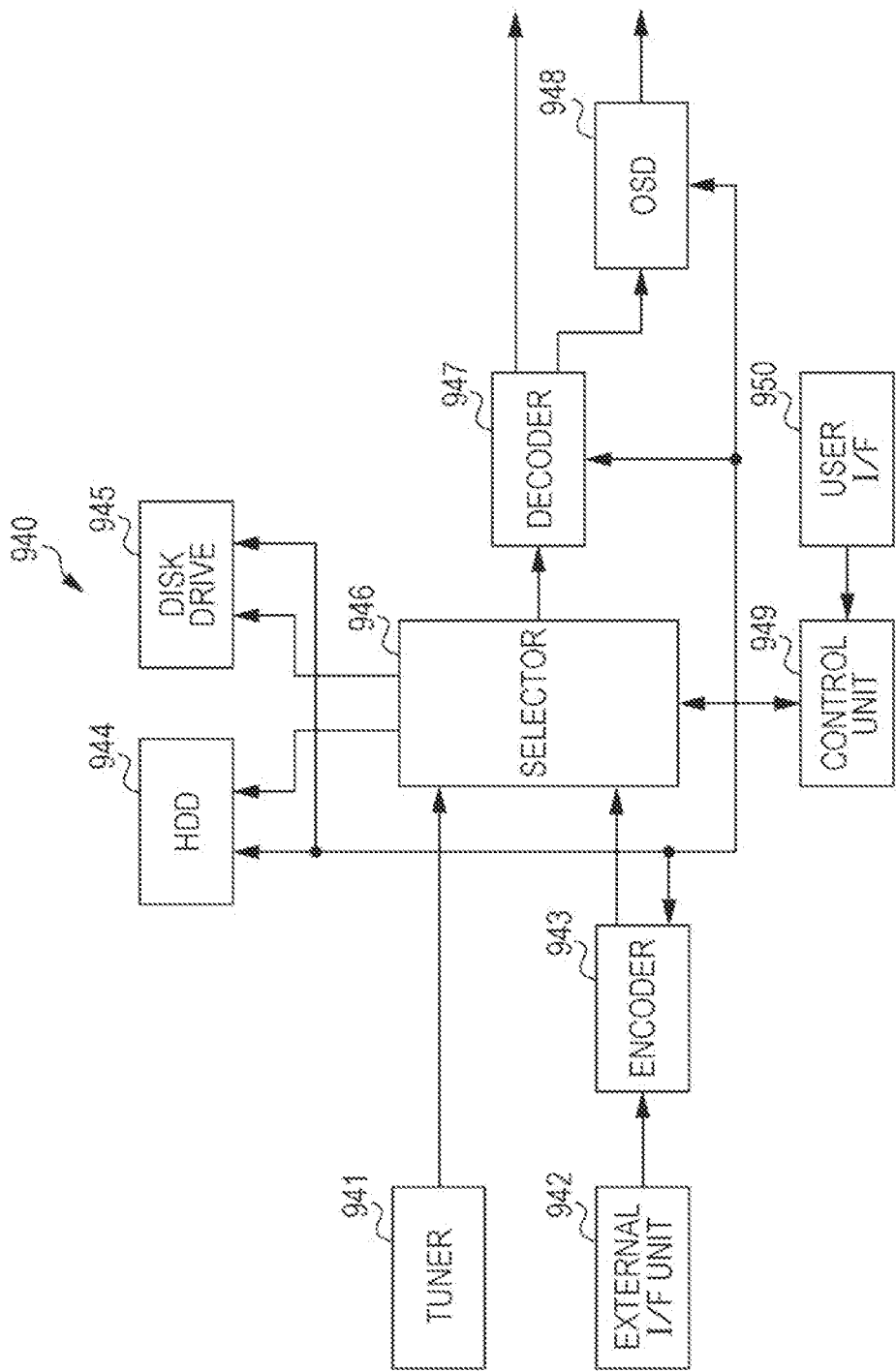
FIG. 20 is a block diagram schematically showing an example structure of a recording/reproducing apparatus.

FIG. 20 schematically shows an example structure of a recording/reproducing apparatus to which the above described embodiments are applied. A recording/reproducing apparatus 940 encodes audio data and video data of a received broadcast show, for example, and records the audio data and the video data on a recording medium. The recording/reproducing apparatus 940 may encode audio data and video data acquired from another apparatus, for example, and record the audio data and the video data on a recording medium. The recording/reproducing apparatus 940 also reproduces data recorded on a recording medium through a monitor and a speaker in accordance with an instruction from the user, for example. In doing so, the recording/reproducing apparatus 940 decodes audio data and video data.

The recording/reproducing apparatus 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from broadcast signals received via an antenna (not shown), and demodulates the extracted signal. The tuner 941 outputs the encoded bit stream obtained through the demodulation to the selector 946. That is, the tuner 941 serves as a transmission unit in the recording/reproducing apparatus 940.

The external interface 942 is an interface for connecting the recording/reproducing apparatus 940 to an external device or a network. The external interface 942 may be an IEEE1394 interface, a network interface, a USB interface, or a flash memory interface, for example. Video data and audio data received via the external interface 942 are input to the encoder 943, for example. That is, the external interface 942 serves as a transmission unit in the recording/reproducing apparatus 940.

In a case where video data and audio data input through the external interface 942 have not been encoded, the encoder 943 encodes the video data and the audio data. The encoder 943 then outputs an encoded bit stream to the selector 946.

The HDD 944 records an encoded bit stream formed with compressed content data such as video images and sound, various programs, and other data on an internal hard disk. When a video image and sound are to be reproduced, the HDD 944 reads those data from the hard disk.

The disk drive 945 records data on and reads data from a recording medium mounted thereon. The recording medium mounted on the disk drive 945 may be a DVD disk (such as a DVD-Video, a DVD-RAM, a DVD-R, a DVD-RW, a DVD+R, or a DVD+RW) or a Blu-ray (a registered trade name) disk, for example.

When a video image and sound are to be recorded, the selector 946 selects an encoded bit stream input from the tuner 941 or the encoder 943, and outputs the selected encoded bit stream to the HDD 944 or the disk drive 945. When a video image and sound are to be reproduced, the selector 946 outputs an encoded bit stream input from the HDD 944 or the disk drive 945, to the decoder 947.

The decoder 947 decodes the encoded bit stream, and generates video data and audio data. The decoder 947 outputs the generated video data to the OSD 948. The decoder 904 also outputs the generated audio data to an external speaker.

The OSD 948 reproduces the video data input from the decoder 947, and displays a video image. The OSD 948 may superimpose an image of a GUI such as a menu, a button, or a cursor on the video image to be displayed.

The control unit 949 includes a processor such as a CPU, and a memory such as a RAM and a ROM. The memory stores the programs to be executed by the CPU, program data, and the like. The programs stored in the memory are read by the CPU at the time of activation of the recording/reproducing apparatus 940, for example, and are then executed. By executing the programs, the CPU controls operations of the recording/reproducing apparatus 940 in accordance with operating signals that are input through the user interface 950, for example.

The user interface 950 is connected to the control unit 949. The user interface 950 includes buttons and switches for the user to operate the recording/reproducing apparatus 940, and a reception unit for receiving remote control signals, for example. The user interface 950 generates an operating signal by detecting an operation by the user via those components, and outputs the generated operating signal to the control unit 949.

In the recording/reproducing apparatus 940 having the above described structure, the encoder 943 has the functions of the image encoding device according to the above described embodiments. Also, the decoder 947 has the functions of the image decoding device according to the above described embodiments. Accordingly, when images are encoded and decoded in the recording/reproducing apparatus 940, increases in the load of the encoding process and the decoding process can be prevented.

9. Ninth Embodiment

Fourth Application: Imaging Apparatus

Figure 21:
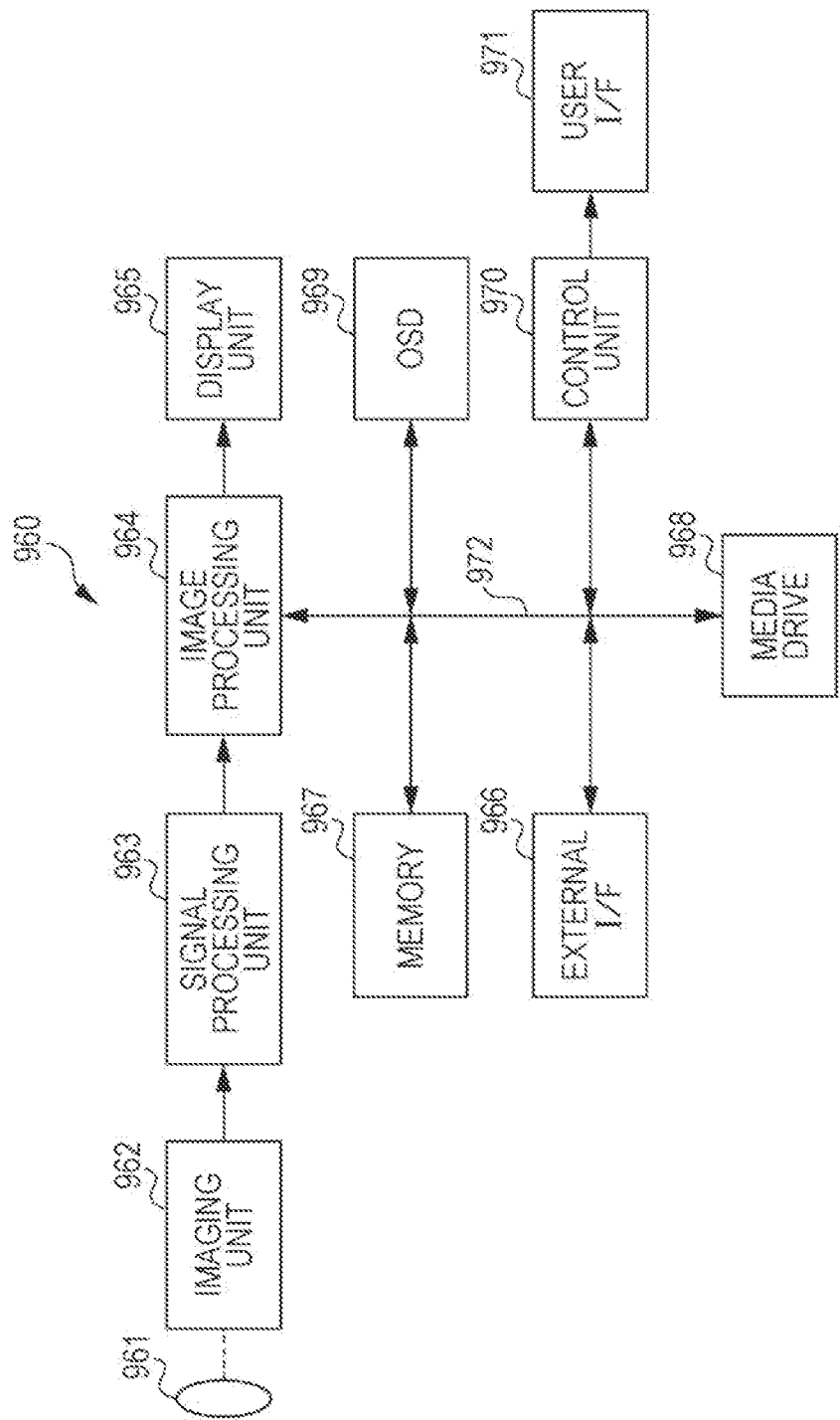
FIG. 21 is a block diagram schematically showing an example structure of an imaging apparatus.

FIG. 21 schematically shows an example structure of an imaging apparatus to which the above described embodiments are applied. An imaging apparatus 960 generates an image by imaging an object, encodes the image data, and records the image data on a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 connects the image processing unit 964, the external interface 966, the memory 967, the media drive 968, the OSD 969, and the control unit 970 to one another.

The optical block 961 includes a focus lens and a diaphragm. The optical block 961 forms an optical image of an object on the imaging surface of the imaging unit 962. The imaging unit 962 includes an image sensor such as a CCD (Charge Coupled Device) or a CMOS (Complementary Metal Oxide Semiconductor), and converts the optical image formed on the imaging surface into an image signal that is an electrical signal through a photoelectric conversion. The imaging unit 962 outputs the image signal to the signal processing unit 963.

The signal processing unit 963 performs various kinds of camera signal processing such as a knee correction, a gamma correction, and a color correction on the image signal that is input from the imaging unit 962. The signal processing unit 963 outputs the image data subjected to the camera signal processing to the image processing unit 964.

The image processing unit 964 encodes the image data input from the signal processing unit 963, and generates encoded data. The image processing unit 964 then outputs the generated encoded data to the external interface 966 or the media drive 968. The image processing unit 964 also decodes encoded data input from the external interface 966 or the media drive 968, and generates image data. The image processing unit 964 then outputs the generated image data to the display unit 965. Alternatively, the image processing unit 964 may output the image data input from the signal processing unit 963 to the display unit 965 to display an image. The image processing unit 964 may also superimpose display data acquired from the OSD 969 on an image to be output to the display unit 965.

The OSD 969 generates an image of a GUI such as a menu, a button, or a cursor, and outputs the generated image to the image processing unit 964.

The external interface 966 is formed as a USB input/output terminal, for example. The external interface 966 connects the imaging apparatus 960 to a printer when an image is to be printed out, for example. A drive is also connected to the external interface 966, if necessary. A removable medium such as a magnetic disk or an optical disk is mounted on the drive so that a program read from the removable medium can be installed into the imaging apparatus 960. Further, the external interface 966 may be designed as a network interface to be connected to a network such as a LAN or the Internet. That is, the external interface 966 serves as a transmission unit in the imaging apparatus 960.

A recording medium to be mounted on the media drive 968 may be any readable/rewritable removable medium such as a magnetic disk, a magnetooptical disk, an optical disk, or a semiconductor memory. Also, a recording medium may be fixed to the media drive 968, to form a non-portable storage unit such as an internal hard disk drive or an SSD (Solid State Drive).

The control unit 970 includes a processor such as a CPU, and a memory such as a RAM and a ROM. The memory stores the programs to be executed by the CPU, program data, and the like. The programs stored in the memory are read by the CPU at the time of activation of the imaging apparatus 960, for example, and are then executed. By executing the programs, the CPU controls operations of the imaging apparatus 960 in accordance with operating signals that are input through the user interface 971, for example.

The user interface 971 is connected to the control unit 970. The user interface 971 includes buttons and switches for the user to operate the imaging apparatus 960, for example. The user interface 971 generates an operating signal by detecting an operation by the user via those components, and outputs the generated operating signal to the control unit 970.

In the imaging apparatus 960 having the above described structure, the image processing unit 964 has the functions of the image encoding device and the image decoding device according to the above described embodiments. Accordingly, when images are encoded and decoded in the imaging apparatus 960, increases in the load of the encoding process and the decoding process can be prevented.

In this specification, various kinds of information such as a threshold value are multiplexed with the header of an encoded stream, and are transmitted from the encoding side to the decoding side, as described above. However, the method of transmitting the information is not limited to the above example. The information may not be multiplexed with an encoded bit stream, but may be transmitted or recorded as independent data associated with an encoded bit stream, for example. Here, the term "associating" means linking an image (or part of an image, such as a slice or a block) included in a bit stream to the information corresponding to the image at the time of decoding. In other words, the information may be transmitted through a transmission path different from the transmission path for images (or bit streams). Also, the information may be recorded on a recording medium (or a different recording area in the same recording medium) different from the recording medium storing images (or bit streams). Further, each piece of the information may be associated with frames, one frame, or part of a frame of images (or bit streams).

Although preferred embodiments of this disclosure have been described in detail with reference to the accompanying drawings, this disclosure is not limited to those examples. It should be apparent that those who have ordinary skills in the art can make various changes or modifications within the scope of the technical spirit claimed herein, and those changes or modifications are naturally considered to fall within the technical scope of this disclosure.

It should be noted that the present technique can also be embodied in the following structures.

(1) An image processing device including:
a temporal prediction control unit that controls, in a prediction of a motion vector, whether a temporal prediction is to be performed to predict the motion vector by using the motion vector of a neighbor region temporally adjacent to the current region being processed; and a motion vector encoding unit that predicts the motion vector of the current region by performing only a spatial prediction to predict the motion vector by using the motion vector of a neighbor region spatially adjacent to the current region or performing both the spatial prediction and the temporal prediction under the control of the temporal prediction control unit, and encodes the motion vector of the current region by using the predicted value.

(2) The image processing device of (1), wherein the temporal prediction control unit controls whether the temporal prediction is to be performed in accordance with the size of the current region.

(3) The image processing device of (2), wherein, when the size of the current region is equal to or smaller than a predetermined threshold value, the temporal prediction control unit performs control so that the temporal prediction is not to be performed.

(4) The image processing device of (3), further including a threshold setting unit that sets the threshold value, wherein, when the size of the current region is equal to or smaller than the threshold value set by the threshold setting unit, the temporal prediction control unit performs control so that the temporal prediction is not to be performed.

(5) The image processing device of (4), wherein the threshold setting unit sets the threshold value in accordance with a profile level.

(6) The image processing device of (3), further including a transmission unit that transmits the threshold value.

(7) The image processing device of (1), wherein the temporal prediction control unit controls whether the temporal prediction is to be performed, in accordance with the number of times a temporally-predicted motion vector that is the motion vector of the current region predicted through the temporal prediction has been adopted as a predicted value of the motion vector of the current value.

(8) The image processing device of (7), wherein, when the number of times per predetermined data unit has reached a predetermined threshold value, the temporal prediction control unit performs control so that the temporal prediction is not to be performed.

(9) The image processing device of (8), further including a threshold setting unit that sets the threshold value, wherein, when the number of times per predetermined data unit has reached the threshold value set by the threshold setting unit, the temporal prediction control unit performs control so that the temporal prediction is not to be performed.

(10) The image processing device of (9), wherein the threshold setting unit sets the threshold value in accordance with a profile level.

(11) The image processing device of (9), wherein the threshold setting unit sets the threshold value in accordance with the size of the predetermined data unit.

(12) The image processing device of (8), wherein the predetermined data unit is an LCU (Largest Coding Unit).

(13) The image processing device of (8), wherein the threshold value is set for each prediction direction, and, when the number of times per predetermined data unit has reached the threshold value for at least one of the prediction directions, the temporal prediction control unit performs control so that the temporal prediction is not to be performed.

(14) The image processing device of (8), further including a transmission unit that transmits the threshold value.

(15) The image processing device of (1), further including:

a determination unit that determines whether all the motion vectors of neighbor regions spatially adjacent to the current region are unavailable; and a setting unit that sets a zero vector as a predicted value of the motion vector of the current region when the determination unit determines that all the motion vectors of the neighbor regions spatially adjacent to the current region are unavailable, regardless of whether the temporal prediction control unit performs control so that the temporal prediction is to be performed.

(16) The image processing device of (1), wherein, when the motion vector of the current region is predicted only through the spatial prediction, the motion vector encoding unit assigns a code number to the predicted value by using a code number assignment table showing types of predicted values excluding the temporal prediction.

(17) The image processing device of (16), further including a transmission unit that transmits the code number assignment table.

(18) The image processing device of (1), wherein the motion vector encoding unit includes:

a temporal prediction unit that performs the temporal prediction and generates a temporally-predicted motion vector as the motion vector of the current region predicted through the temporal prediction, when the temporal prediction is allowed by the temporal prediction control unit;

a spatial prediction unit that performs the spatial prediction, and generates a spatially-predicted motion vector as the motion vector of the current region predicted through the spatial prediction;

a predicted motion vector generation unit that sets a predicted value of the motion vector of the current region that is the temporally-predicted motion vector generated by the temporal prediction unit or the spatially-predicted motion vector generated by the spatial prediction unit, whichever is more similar to the motion vector of the current region; and a difference value calculation unit that calculates a difference value between the motion vector of the current region and the predicted value generated by the predicted motion vector generation unit.

(19) The image processing device of (18), further including a transmission unit that transmits the difference value calculated by the difference value calculation unit.

(20) An image processing method for an image processing device, the image processing method including:

controlling, in a prediction of a motion vector, whether a temporal prediction is to be performed to predict the motion vector by using the motion vector of a neighbor region temporally adjacent to the current region being processed, the controlling being performed by the temporal prediction control unit; and under the control of the temporal prediction control unit, predicting the motion vector of the current region by performing only a spatial prediction to predict the motion vector by using the motion vector of a neighbor region spatially adjacent to the current region or performing both the spatial prediction and the temporal prediction, and encoding the motion vector of the current region by using the predicted value, the predicting and the encoding being performed by the motion vector encoding unit.

REFERENCE SIGNS LIST

100 Image encoding device
115 Motion prediction/compensation unit

121 Temporal prediction control unit
122 motion vector encoding unit
141 Threshold setting unit
142 Region size determination unit
151 Spatially-predicted motion vector determination unit
152 Temporally-predicted motion vector determination unit
153 Predicted motion vector generation unit
154 Difference motion vector generation unit
201 Threshold setting unit
202 Temporally-predicted motion vector counter
203 Adoption frequency determination unit
400 Image decoding device
412 Motion prediction/compensation unit
421 Motion vector decoding unit
422 Predicted motion vector check unit
451 Threshold setting unit
452 Region size determination unit
453 Motion vector encoding method determination unit
454 Control unit

The invention claimed is:

1. An image processing device comprising:
circuitry configured to
control, in a prediction of a predicted value of a motion vector, whether a temporal prediction is to be performed to predict the motion vector by using a motion vector of a neighbor region temporally adjacent to a current region being processed, in accordance with a number of times that a temporally-predicted motion vector has been adopted as the predicted value of the motion vector of the current region, and
predict the motion vector of the current region by performing only a spatial prediction to predict the motion vector by using a motion vector of a neighbor region spatially adjacent to the current region or performing both the spatial prediction and the temporal prediction, and encode the motion vector of the current region by using the predicted value,
wherein, when the number of times that the temporally-predicted motion vector has been adopted per predetermined data unit reaches a predetermined temporal prediction threshold value, the circuitry is further configured to perform control so that the temporal prediction is not to be performed.

2. The image processing device according to claim 1, wherein the circuitry is further configured to control whether the temporal prediction is to be performed in accordance with a size of the current region.

3. The image processing device according to claim 2, wherein, when the size of the current region is equal to or smaller than a predetermined region size threshold value, the circuitry is further configured to perform control so that the temporal prediction is not to be performed.

4. The image processing device according to claim 3, wherein the circuitry is further configured to set the predetermined region size threshold value, wherein, when the size of the current region is equal to or smaller than the set region size threshold value, the circuitry is further configured to perform control so that the temporal prediction is not to be performed.

5. The image processing device according to claim 4, wherein the circuitry is further configured to set the predetermined region size threshold value in accordance with a profile level.

6. The image processing device according to claim 3, wherein the circuitry is further configured to initiate a transmission of the predetermined region size threshold value.

7. The image processing device according to claim 1, wherein the circuitry is further configured to set the predetermined temporal prediction threshold value, wherein, when the number of times per predetermined data unit has reached the set temporal prediction threshold value, the circuitry is further configured to perform control so that the temporal prediction is not to be performed.

8. The image processing device according to claim 7, wherein the circuitry is further configured to set the predetermined temporal prediction threshold value in accordance with a profile level.

9. The image processing device according to claim 7, wherein the circuitry is further configured to set the predetermined temporal prediction threshold value in accordance with a size of the predetermined data unit.

10. The image processing device according to claim 1, wherein the predetermined data unit is an LCU (Largest Coding Unit).

11. The image processing device according to claim 7, wherein the predetermined temporal prediction threshold value is set for each prediction direction, and,
when the number of times per predetermined data unit has reached the predetermined temporal prediction threshold value for at least one of the prediction directions, the circuitry is further configured to perform control so that the temporal prediction is not to be performed.

12. The image processing device according to claim 1, wherein the circuitry is further configured to transmit the predetermined temporal prediction threshold value.

13. The image processing device according to claim 1, wherein the circuitry is further configured to
determine whether all motion vectors of neighbor regions spatially adjacent to the current region are unavailable, and
set a zero vector as the predicted value of the motion vector of the current region when the determination unit determines that all the motion vectors of the neighbor regions spatially adjacent to the current region are unavailable, regardless of whether the temporal prediction is to be performed.

14. The image processing device according to claim 1, wherein, when the motion vector of the current region is predicted only through the spatial prediction, the circuitry is further configured to assign a code number to the predicted value by using a code number assignment table showing types of predicted values excluding the temporal prediction.

15. The image processing device according to claim 14, wherein the circuitry is further configured to initiate a transmission of the code number assignment table.

16. The image processing device according to claim 1, wherein the circuitry is further configured to
perform the temporal prediction and generate a temporally-predicted motion vector as the motion vector of the current region predicted through the temporal prediction, when the temporal prediction is allowed,
perform the spatial prediction, and generate a spatially-predicted motion vector as the motion vector of the current region predicted through the spatial prediction,
set the predicted value of the motion vector of the current region, the predicted value being the temporally-predicted motion vector or the spatially-predicted motion vector, whichever is more similar to the motion vector of the current region, and calculate a difference value between the motion vector of the current region and the predicted value generated by the predicted motion vector generation unit.

17. The image processing device according to claim 16, wherein the circuitry is further configured to transmit the calculated difference value.

18. An image processing method for an image processing device, performed via at least one processor, the image processing method comprising:
controlling, in a prediction of a predicted value of a motion vector, whether a temporal prediction is to be performed to predict the motion vector by using a motion vector of a neighbor region temporally adjacent to a current region being processed, in accordance with a number of times that a temporally-predicted motion vector has been adopted as the predicted value of the motion vector of the current region;
predicting the motion vector of the current region by performing only a spatial prediction to predict the motion vector by using a motion vector of a neighbor region spatially adjacent to the current region or performing both the spatial prediction and the temporal prediction, and encoding the motion vector of the current region by using the predicted value;
performing, when the number of times that the temporally-predicted motion vector has been adopted per predetermined data unit reaches a predetermined temporal prediction threshold value, control so that the temporal prediction is not to be performed.

* * * * *